(12) United States Patent
Han et al.

(10) Patent No.: US 11,241,990 B2
(45) Date of Patent: Feb. 8, 2022

(54) SIDE TABLE ASSEMBLY FOR VEHICLE SEAT

(71) Applicants: Hyundai Motor Company, Seoul (KR); Kia Motors Corporation, Seoul (KR); Adient Korea, Inc., Chungcheongnam-do (KR)

(72) Inventors: Kug-Hun Han, Seoul (KR); Sang-Ho Kim, Incheon (KR); Sang-Hwi Yoon, Incheon (KR); In-Seok Oh, Gyeonggi-do (KR); Ki-Seok Kwun, Gyeonggi-do (KR); Young-Kyun Oh, Gyeonggi-do (KR)

(73) Assignees: Hyundai Motor Company, Seoul (KR); Kia Motors Corporation, Seoul (KR); Adient Korea, Inc., Chungcheongnam-do (KR)

( * ) Notice: Subject to any disclaimer, the term of this patent is extended or adjusted under 35 U.S.C. 154(b) by 190 days.

(21) Appl. No.: 16/351,084

(22) Filed: Mar. 12, 2019

(65) Prior Publication Data

US 2019/0359108 A1 Nov. 28, 2019

(30) Foreign Application Priority Data

May 25, 2018 (KR) .......................... 10-2018-0059680

(51) Int. Cl.
*B60N 3/00* (2006.01)
*B60N 3/10* (2006.01)

(52) U.S. Cl.
CPC .............. *B60N 3/001* (2013.01); *B60N 3/10* (2013.01)

(58) Field of Classification Search
CPC ........... B60N 3/001; B60N 3/10; B60N 3/002
USPC ......................... 312/292, 42, 47, 48; 108/44
See application file for complete search history.

(56) References Cited

U.S. PATENT DOCUMENTS

| | | | |
|---|---|---|---|
| 6,336,252 B1 * | 1/2002 | Bando | F16F 7/06 16/307 |
| 6,665,906 B2 * | 12/2003 | Li | E05D 11/1078 16/303 |
| 6,877,806 B2 * | 4/2005 | Cutshall | A47B 23/02 108/9 |

(Continued)

FOREIGN PATENT DOCUMENTS

| | | |
|---|---|---|
| JP | 2010215073 A | 9/2010 |
| JP | 2015136976 A | 7/2015 |
| KR | 20050038370 A | 4/2005 |

*Primary Examiner* — Brian D Mattei
*Assistant Examiner* — Timothy M Ayres
(74) *Attorney, Agent, or Firm* — Mintz Levin Cohn Ferris Glovsky and Popeo, P.C.; Peter F. Corless

(57) ABSTRACT

A side table assembly for a vehicle seat includes a table on which a cup holder inserting part is formed, a body arranged on a side face of the vehicle seat, a joint hinge device coupled between the body and the table to allow the table to be rotated with respect to the body; and a cup holder having an opened upper face and a closed lower face and coupled to the cup holder inserting part. The joint hinge device includes a joint hinge connected to the table at one side and connected to the body at another side, a hinge spring inserted into the joint hinge to elastically support the joint hinge, and a hinge cylinder having one side inserted into the joint hinge and being in contact with the hinge spring and another side inserted into by the body.

13 Claims, 36 Drawing Sheets

(56) References Cited

U.S. PATENT DOCUMENTS

| | | | | |
|---|---|---|---|---|
| 7,344,056 B2* | 3/2008 | Shelmon | ............... | B60N 3/002 |
| | | | | 224/549 |
| 8,075,072 B2* | 12/2011 | Gwak | ................... | F25D 23/025 |
| | | | | 312/292 |
| 8,182,055 B2* | 5/2012 | Yun | ...................... | E05F 1/1215 |
| | | | | 312/405 |
| 8,579,149 B2* | 11/2013 | Henke | ................... | B60N 3/106 |
| | | | | 220/737 |
| 8,763,538 B2* | 7/2014 | Fukuhara | .............. | B60N 3/002 |
| | | | | 108/77 |
| 8,881,659 B2* | 11/2014 | Ackeret | ................. | B60N 3/002 |
| | | | | 108/44 |
| 9,085,244 B2* | 7/2015 | Tsuchida | ................ | A47B 83/02 |
| 9,221,581 B2* | 12/2015 | Yokota | ................... | B60N 3/105 |
| 9,278,638 B2* | 3/2016 | Tsuchida | .................. | B60N 2/20 |
| 9,422,059 B2* | 8/2016 | Martinak | ........... | B64D 11/0638 |
| 9,539,926 B2* | 1/2017 | Furukawa | ............. | B60N 3/102 |
| 9,545,154 B2* | 1/2017 | Duke | .................. | A47B 96/028 |
| 2004/0069792 A1* | 4/2004 | Schaal | .................. | B60N 3/106 |
| | | | | 220/737 |
| 2015/0114270 A1 | 4/2015 | Tsuchida | | |
| 2016/0000248 A1 | 1/2016 | Shen | | |

* cited by examiner

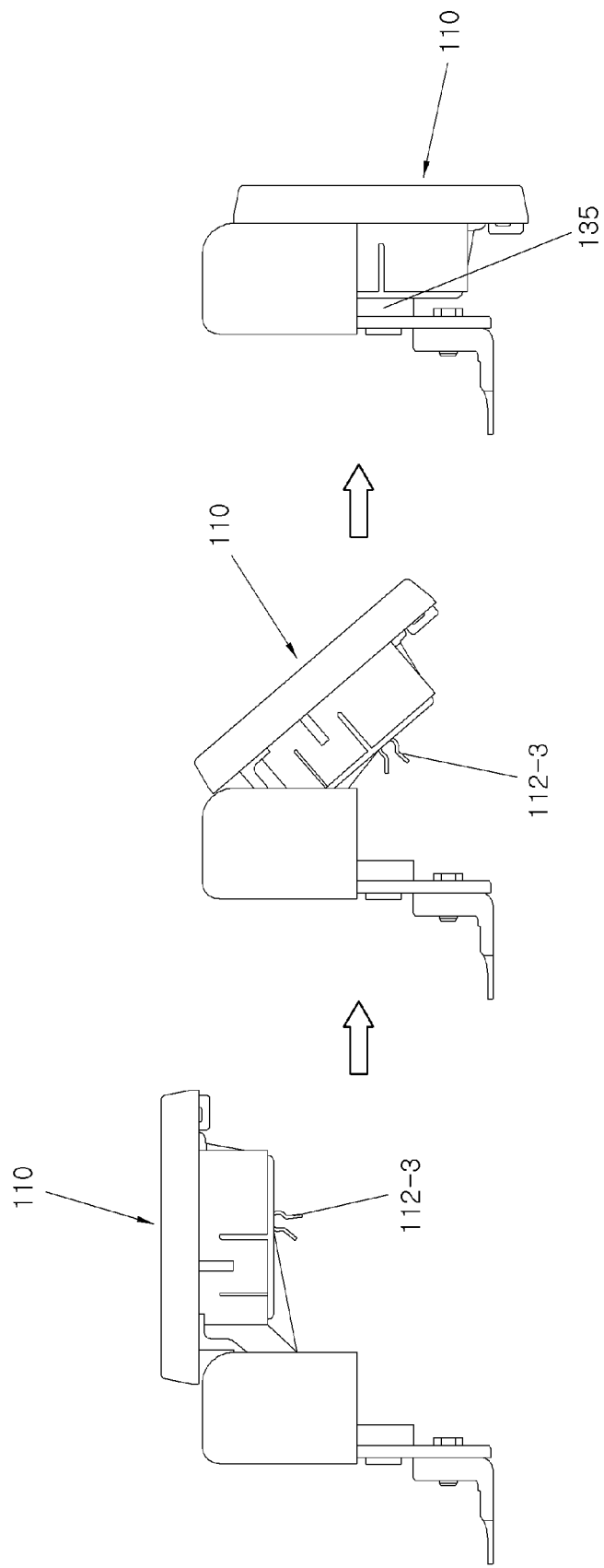

SIDE TABLE ASSEMBLY FOR VEHICLE SEAT

CROSS-REFERENCE TO RELATED APPLICATION

This application claims under 35 U.S.C. § 119(a) the benefit of Korean Patent Application No. 10-2018-0059680, filed on May 25, 2018, the entire contents of which are incorporated herein by reference.

BACKGROUND

(a) Technical Field

The present disclosure relates to a side table assembly for a seat, which is coupled to a vehicle seat.

(b) Description of Related Art

Various devices and structures are equipped in an interior of a vehicle for the convenience of passengers.

A table mounted on a side face of a vehicle seat is one such convenience item. However, such a table is typically applied only to a first-row seat as a substitute for a floor console, and is not commonly provided in a second-row seat.

In addition, in view of indoor space utilization, such side table is generally configured such that the table is unfolded to be used and the table is folded in a downward direction when not in use, so as to occupy only limited space in the vehicle interior.

As a conventional example of a side table, a table disclosed in Korean Patent Laid-Open Nos. 10-2005-0038370 and U.S. Patent Publication No. 2015-0114270 adopts a configuration in which at a location where the table is used, two links form obtuse angle to apply a robust link structure in a direction of their own weight. However, in such a configuration, since there should be no obstacle in a link trajectory, it is necessary to release the obtuse angle structure supported in the self-weight direction in order to expose a lower end appearance and fold the table, To this end, accordingly, a lever is inevitably required.

in addition, tables disclosed in U.S. Patent Publication No. 2016-0000248 and Japanese Patent Laid Open Publication Nos. 2010-215073 and 2015-136073 have limitations in that it is difficult for a cup holder to accommodate a cup having a large depth, and when the table is mounted on a second-row seat, a thickness of the table which is not in use should be relatively thin in order to secure an entry space for a third-row seat.

The contents described in Description of Related Art are to help the understanding of the background of the present disclosure, and may include what is not previously known to those skilled in the art to which the present disclosure pertains.

SUMMARY

The present disclosure provides a side table assembly for a vehicle seat, which can fold and unfold a table without using a lever, has sufficient strength, and can accommodate even a large cup.

A side table assembly for a vehicle seat according to one aspect of the present disclosure may include a table on which a cup holder inserting part is formed; a body configured to be arranged on a side face of the vehicle seat; a joint hinge device coupled between the body and the table to allow the table to be rotated with respect to the body; and a cylindrical cup holder having an opened upper face and a closed lower face, and the cup holder being configured to be coupled to the cup holder inserting part. Here, the joint hinge device may include a joint hinge configured to be connected to the table at one side and connected to the body at the other side; a hinge spring inserted into the joint hinge to elastically support the joint hinge in a longitudinal direction of the body; and a hinge cylinder configured to have one side inserted into the joint hinge and being contact with the hinge spring and the other side inserted into and supported by the body.

In addition, the joint hinge may include a coupling part having a flat face and a guide part formed at one side of the coupling part and having a circular shape in a cross section, and the guide part may be configured such that a cylinder inserting hole into which the hinge spring and the hinge cylinder are inserted is formed on one side thereof, and a circular protrusion having a circular shape in cross section and protruding therefrom and a rectangular protrusion having a rectangular shape in cross section and protruding from the circular protrusion are formed on the other side thereof.

Also, the body may be configured such that a circular inserting recess and a rectangular inserting recess corresponding to the circular protrusion and the rectangular protrusion, respectively, are sequentially formed thereon.

Further, the hinge cylinder may be configured to allow a hinge stopper to be coupled thereto to restrict a movement of the joint hinge towards the hinge cylinder.

Meanwhile, the cup holder inserting part may have an opened upper face and a closed lower face and may be formed in a double cylindrical shape extending downward from the table, and the cup holder may be inserted between the double cylinders of the cup holder inserting part.

Also, the cup holder may have a plurality of cutouts formed thereon and a plurality of protrusions formed in the plurality of cutout, respectively, in an upward direction, the cut holder inserting part may have a plurality of protrusions corresponding to the protrusions of the cup holder and formed between the double cylinders in a downward direction, and the cup holder may further include a return spring, and the protrusion of the cup holder is inserted into a first side of the return spring and the protrusion of the cup holder inserting part is inserted into a second side of the return spring.

In addition, the cup holder may have a plurality of hooks formed on an upper side thereof and protruding outward, and a plurality of hook guide slits corresponding to the plurality of hooks may be formed on an upper side of the cup holder inserting part, whereby when the cup holder is moved downward by an external force, the plurality of hooks are engaged with the plurality of hook guide slits to limit a downward movement distance.

Meanwhile, the side table assembly for a vehicle may further include a frame configured to be coupled to the body; and a mounting bracket configured to couple the frame to the seat. Here, the frame may include an upper bracket provided in a direction corresponding to a longitudinal direction of the body and being coupled to an inner face of the body; a plurality of middle brackets configured to extend downward from the upper bracket; and a lower bracket configured to be connected between the middle brackets.

Also, the frame may further include a stopper plate coupled to two middle brackets of the plurality of middle brackets at both sides thereof.

Here, the stopper plate may be coupled at a position corresponding to the cup holder inserting part.

Further, the table may have a reinforcing rib formed on a rear face thereof, and the upper bracket may have a reinforcing rib supporter formed thereon and configured to support the reinforcing rib in a state in which the table is unfolded.

In addition, a wire guide is coupled to the rear face of the table and a wire configured to be coupled to the wire guide in a state in which the table is folded is coupled to the middle bracket.

Meanwhile, the side table assembly for a vehicle seat may further include a cup rotator having a circular support part having a diameter larger than that of a side face of the cup holder inserting part and an operation part extended and protruded outward from one side of the circular support part. Here, a plurality of inner protrusions may be formed on an inside of the circular support part, and a rotator guide may be formed by cutting the cup holder inserting part in a longitudinal direction, whereby the cup rotator is inserted into the cut holder inserting part by inserting the inner protrusion of the cup rotator into the rotator guide.

Also, the rotator guide may have a rotator fixing slit formed on an upper side thereof and extended in a circumferential direction of the cup holder inserting part.

In addition, the cup holder may have a rotator restricting groove formed on an outer side thereof, and an inner protrusion may be formed on and protruded from one side in the rotator restricting groove.

Further, the cup holder may have a plurality of hooks formed on an upper side thereof and protruded outward, and the cup holder inserting part may have a plurality of hook guide slits formed on an upper side thereof and corresponding to the plurality of hooks, respectively, whereby when the cup holder is moved downward by an external force, the plurality of hooks are engaged with the plurality of hook guide slits, respectively to limit a downward movement distance.

Meanwhile, the side table assembly for a vehicle seat may further include button configured to be inserted into a button recess formed on the table. Here, the button may include a push part exposed on the table and an operation part formed to extend from the push part in a downward direction, whereby when the button is pushed, the operation part of the button pushes the operation part of the cup rotator restricted in the rotator restricting groove to allow the operation part of the cup rotator to be deviated from the inner protrusion of the rotator restricting groove.

Subsequently, a side table assembly for a vehicle seat according to another aspect of the present disclosure may include a table on which a cup holder inserting part is formed; a body configured to be arranged on a side face of the vehicle seat; a joint hinge device coupled between the body and the table to allow the table to be rotated with respect to the body; and a cup holder comprising a bottom plate provided at a lower side of the cup inserting part. Here, the bottom plate may be operated in a downward direction by a link mechanism due to a weight.

Here, the cup holder may include a first link configured to be connected to the bottom plate; a second link configured to be connected to the first link through one side thereof and connected to a table fixing part, which is connected to a rear face of the table, through the other side thereof; rotation hinges configured to connect the bottom plate and the first link, and the bottom plate and the second link; and a tension spring configured to be fixed to the rear face of the table through one side thereof and to support the second link through the other side thereof.

In addition, the joint hinge device may include a joint hinge configured to have one side coupled to the table and the other side coupled to the body; a hinge spring configured to be inserted into the joint hinge to support the joint hinge in a longitudinal direction of the body; and a hinge cylinder configured to have one side inserted into the joint hinge to be in contact with the hinge spring and the other side inserted into and supported by the body.

BRIEF DESCRIPTION OF THE DRAWINGS

FIG. 13 is a view illustrating an overall operation state of the side table assembly.

DESCRIPTION OF SPECIFIC EMBODIMENTS

Figure 1A:
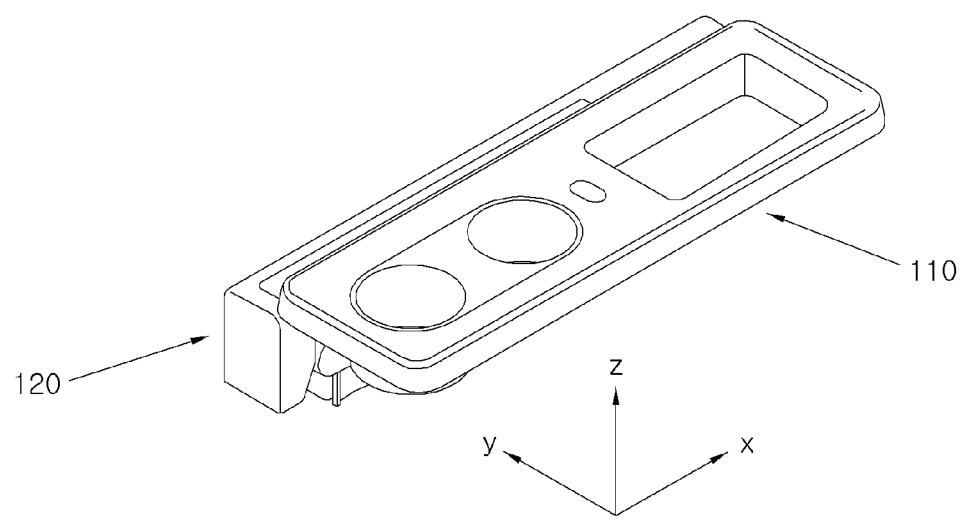
FIG. 1A is a perspective view of a side table assembly according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In order to fully understand the present disclosure, operational advantages of the present disclosure, objects achieved by embodiments of the present disclosure, reference should be made to the accompanying drawings and contents illustrated in the accompanying drawings which illustrate the preferred embodiments of the present disclosure.

In describing the preferred embodiments of the present disclosure, well-known techniques or repetitive descriptions that may unnecessarily obscure the gist of the present disclosure will be reduced or omitted.

Figure 1B:
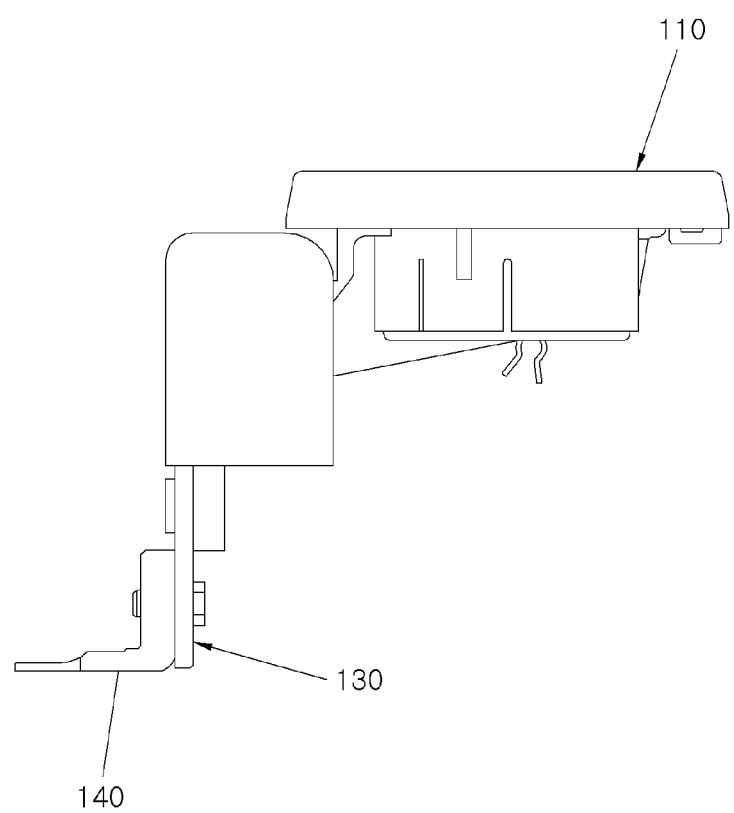
FIG. 1B is a side view viewed along an x-axis in FIG. 1A.

FIG. 1A is a perspective view of a side table assembly according to the present disclosure, and FIG. 1B is a side view viewed along an x-axis in FIG. 1A.

A side table assembly for a vehicle seat according to one embodiment of the present disclosure is a device which is arranged on a side of a vehicle seat and can be folded or unfolded so that when in use, a table can be horizontally unfolded to allow a cup and the like to be seated thereon or held, and when not in use, the table can be folded to secure a space.

To this end, the side table assembly includes a table 110 configured to be horizontally unfolded, a body 120 coupled to one side of the table 110 to support the table 110, a frame 130 configured to stably support the body 120, a mounting bracket 140 coupled to the frame 130 on one side thereof and coupled to a seat part of a seat on the other side, and so forth.

Figure 2A:
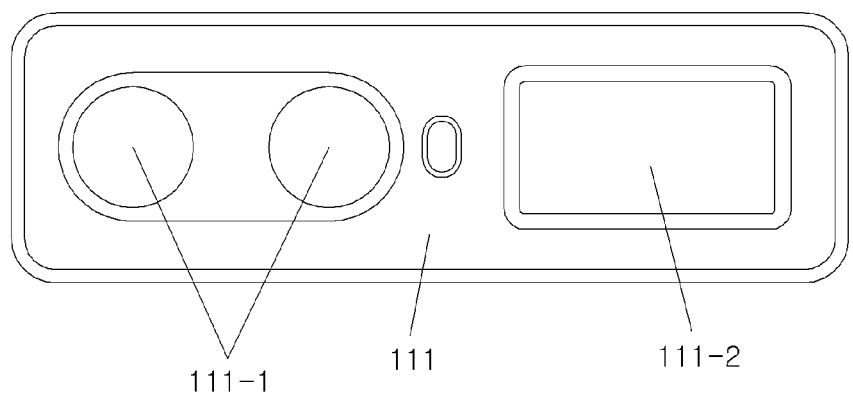
FIG. 2A is a plan view of a table of the side table assembly according to the present disclosure.
Figure 2B:
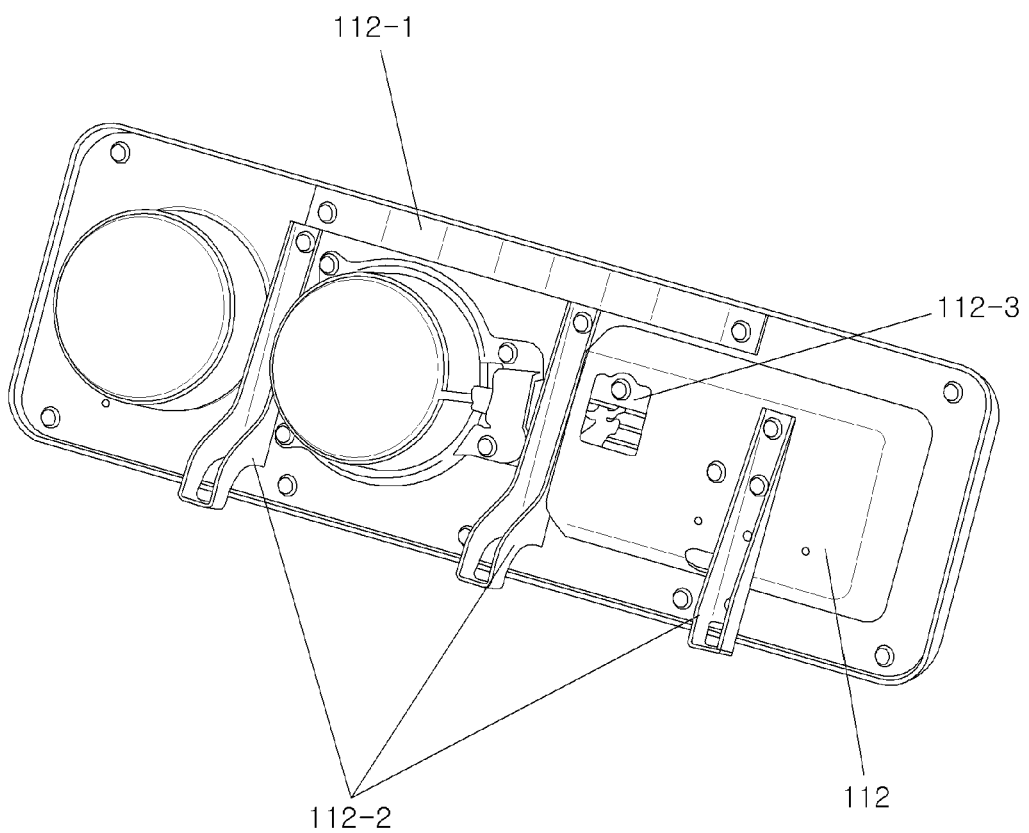
FIG. 2B is a rear perspective view of the table.

FIG. 2A is a plan view of the table of the side table assembly according to the present disclosure, and FIG. 2B is a rear perspective view of the table.

The table 110 may be configured to be horizontally unfolded in parallel with the seat part of the seat for use and be folded in a downward direction.

The table 110 includes an upper plate 111 on which article(s) may be placed and kept and a rear panel 112 coupled to a lower face of the upper plate 111.

It is preferable that the table 110 has an approximately rectangular planar shape.

In the upper plate 111, a cup holder inserting part 111-1 into which a cup holder for supporting a cup may be inserted is formed, and a storage cavity part 111-2 capable of keeping a cellular phone or the like therein is formed.

A handle 112-1 is provided on a side of the rear panel 112, which is opposite to one side coupled with the body 120, so that a user can grasp the handle to unfold the table 110.

A reinforcing rib 112-2 is formed on the rear panel for rigidity against the load of the table 110 which is horizontally unfolded.

The plurality of reinforcing ribs 112-2 are provided to extend in a width direction, which is the short direction of the approximately rectangular-shaped table 110.

A wire guide 112-3 is provided such that the wire guide is coupled to a wire 134 formed on the frame 130, which will be described later, to maintain a folded state when the table 110 is folded.

The wire guide 112-3 is provided in a bent plate shape to have elasticity, an entrance side of the wire guide has a flared shape so as to be coupled with the wire 134, and a passage having a narrow width is formed in an intermediate portion. Therefore, after the wire 134 widens a gap in the wire guide 112-1 and is then inserted, the wire guide is shrunk again to prevent the wire from being escaped from the wire guide.

Figure 3A:
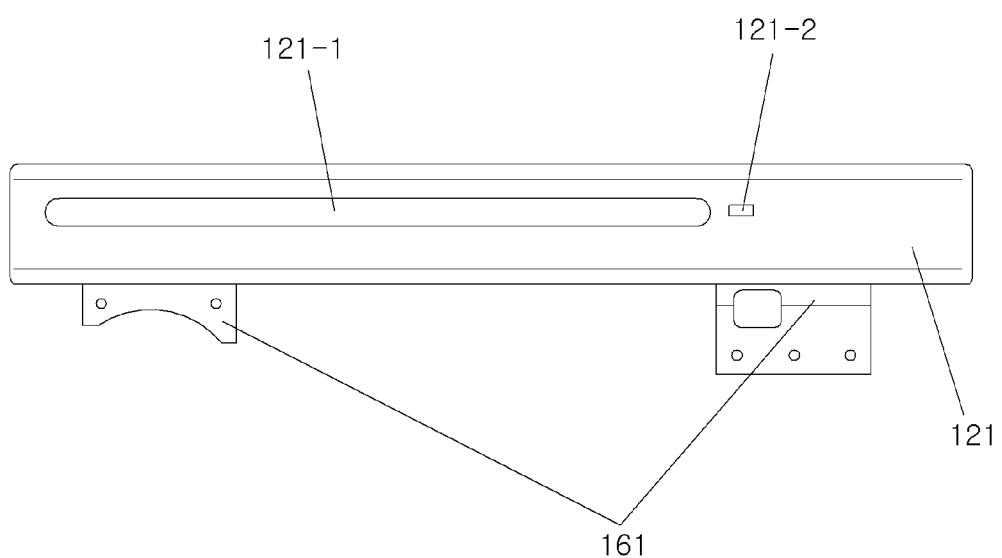
FIG. 3A is a plan view of a body of the side table assembly according to the present disclosure.
Figure 3B:
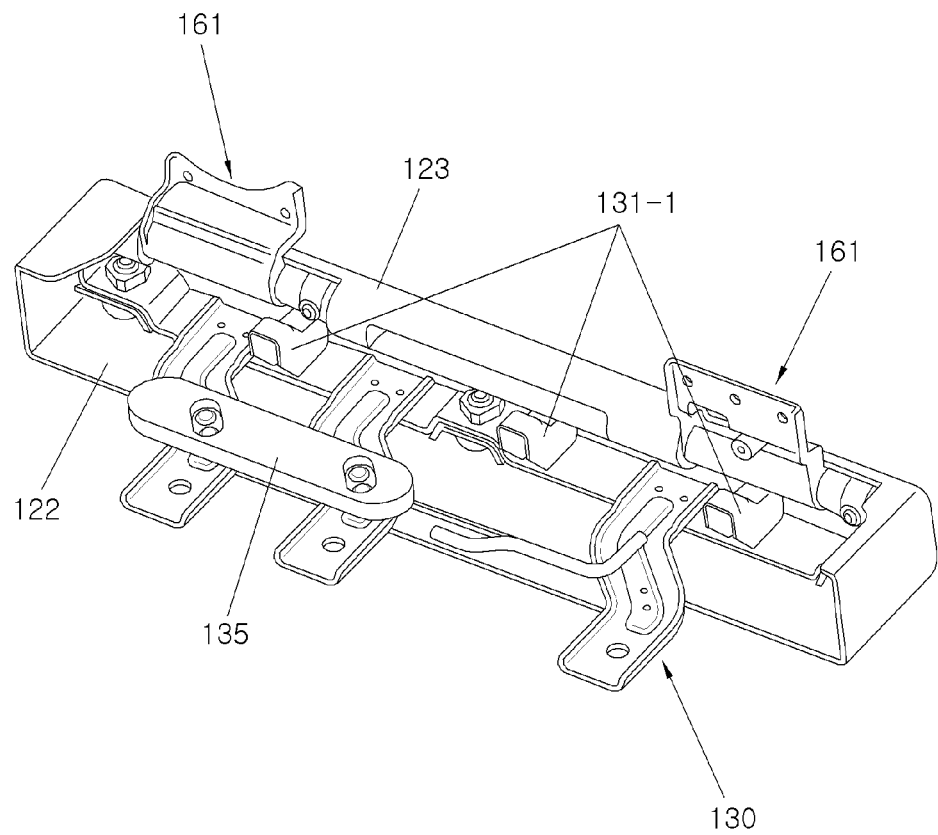
FIG. 3B is a rear perspective view of the body.

FIG. 3A is a plan view of a body of the side table assembly according to the present disclosure, and FIG. 3B is a rear perspective view of the body.

The body 120 has an upper face 121 formed thereon in parallel with the table 110 and a seat seating face 122 is formed to be vertically extended downward from one side of the upper face 121, so that the seat seating face 122 may be in contact with a side face of the seat of the seat part to be supported.

A pen groove 121-1 in which a pen may be placed and a USB terminal slit 121-1 configured to enable a USB to be connected thereto may be formed on the upper face 121.

A hinge coupling part 123 configured to be coupled with a joint hinge device 160, which will be described later, is formed on the other side of the seat seating face 122 with respect to the upper face 121.

Figure 4:
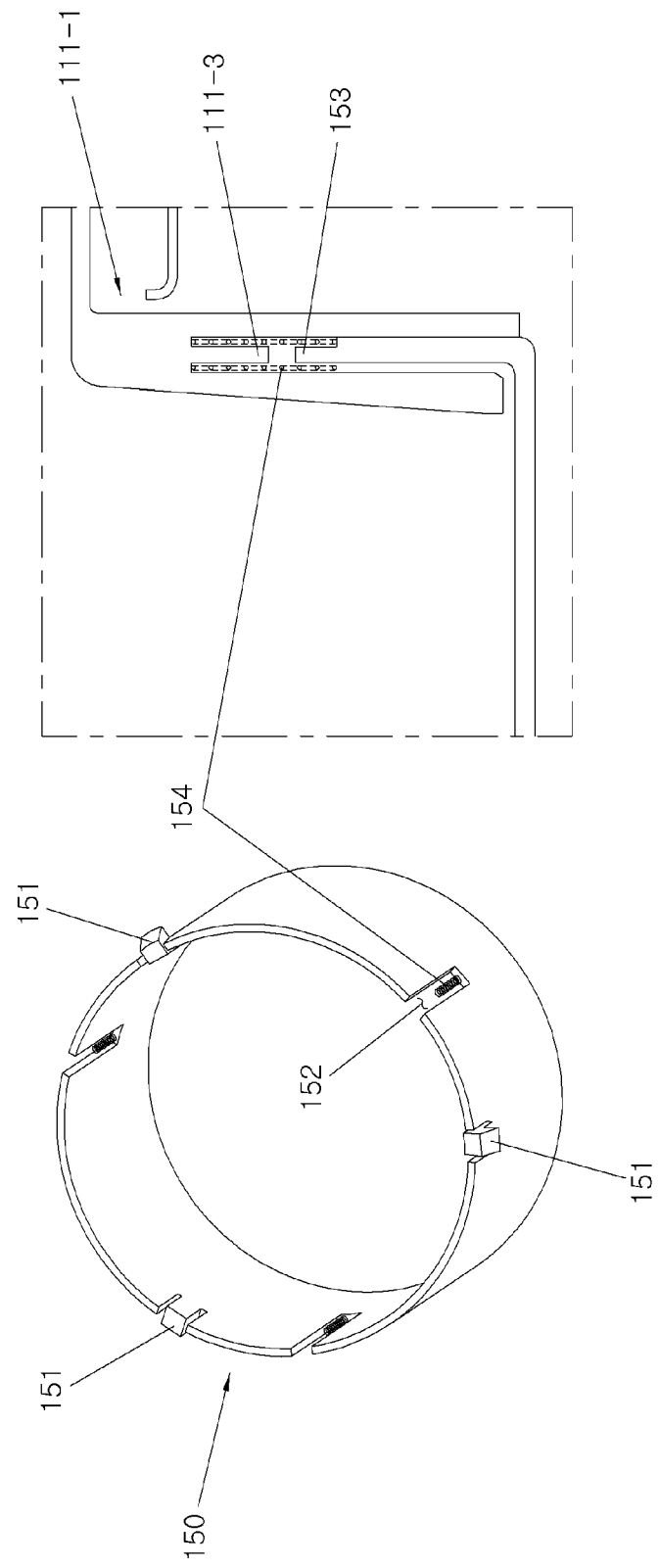
FIGS. 4 and 5 are views illustrating a cup holder of the side table assembly according to the present disclosure and a state in which the cup holder is mounted on the table, respectively.
Figure 5:
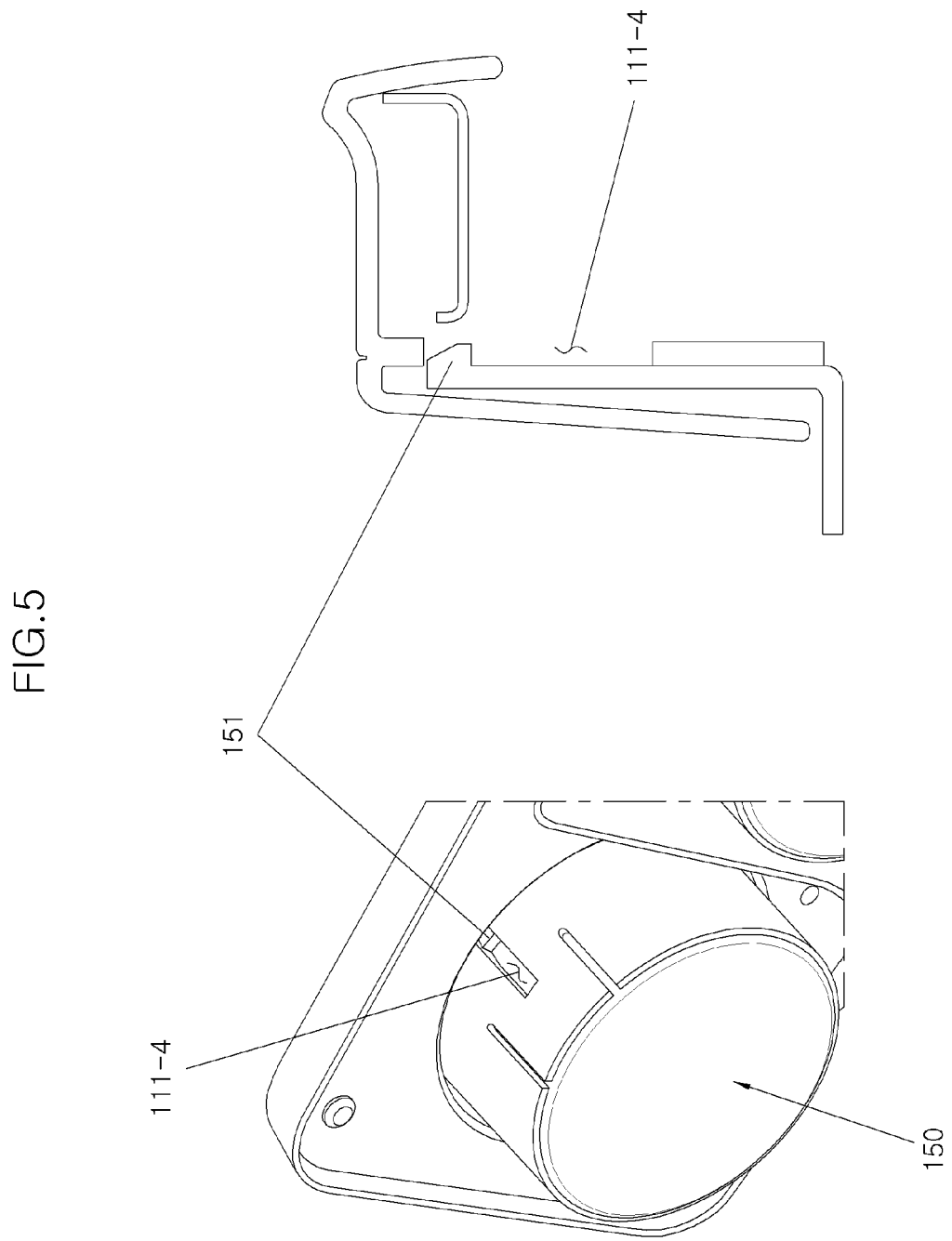

FIGS. 4 and 5 are views illustrating a cup holder of the side table assembly according to the present disclosure and a state in which the cup holder is mounted on the table, respectively.

The cup holder 150 is a configuration which may be coupled to the cup holder inserting part 111-1 of the table 110 to hold a cup.

To this end, the cup holder 150 has a closed cylindrical external appearance having an opened upper face and a closed lower face to support the cup.

An upper side face of the cup holder is cut to form a plurality of hooks 151 (three hooks are shown in FIG. 4) which protrudes outward. In addition to the hooks, a plurality of cutouts 152 are formed on the upper side face, and protrusions 153 are formed in the cutout 152, respectively, in an upward direction.

The above described configuration is a configuration for coupling the cup holder to the cup holder inserting part 111-1 and an operation thereof. To this end, the cup holder inserting part 111-1 has a shape which extends downward from the upper plate 111 of the table 110 to have a cylindrical side face correspond to the cup holder 150. In the cup holder inserting part, in addition, a lower face is opened and the downward side face is formed in the form of double walls.

In the cup holder inserting part 111-1 having the double wall shape, a protrusion 111-3 is formed in a downward direction in a space between the double walls as illustrated in FIG. 5.

Thus, when the cup holder 150 is inserted from a lower side of the cup holder inserting part 111-1, a side face of the cup holder 150 is inserted into the space between the double walls of the cup holder inserting part 111-1, a first side of a return spring 154 is inserted into the protrusion 153 of the cup holder 150, and a second side of the return spring 154 is inserted into the protrusion 111-3 of the cup holder inserting part 111-1.

As a result, when the cup is inserted from an upper side of the cup holder inserting part 111-1 and seated on the cup holder 150, the return spring 154 extends due to a weight of the cup, so that even when the cup is large, the cup holder stably holds the cup. In addition, when the cup is removed, the return spring 154 is restored to move the cup holder 150 upward to its original position.

Also, the plurality of hook guide slits 111-4 are formed on the upper side face of the cup holder inserting part 111-1 and the hook 151 of the cup holder 150 passes through the hook guide slit 111-4, so that the hook and the hook guide slit prevent the cup holder from being escaped from the cup holder inserting part 111-1 even when the cup holder 150 is operated in a downward direction.

That is, when the cup holder 150 is inserted from the lower side of the cup holder inserting part 111-1, the hook 151 is elastically deformed to the inside of the cup holder 150 and then reaches the hook guide slit 111-4 to be restored and protruded outward.

Next, the joint hinge device is described with reference to FIGS. 6 to 8.

Figure 6:
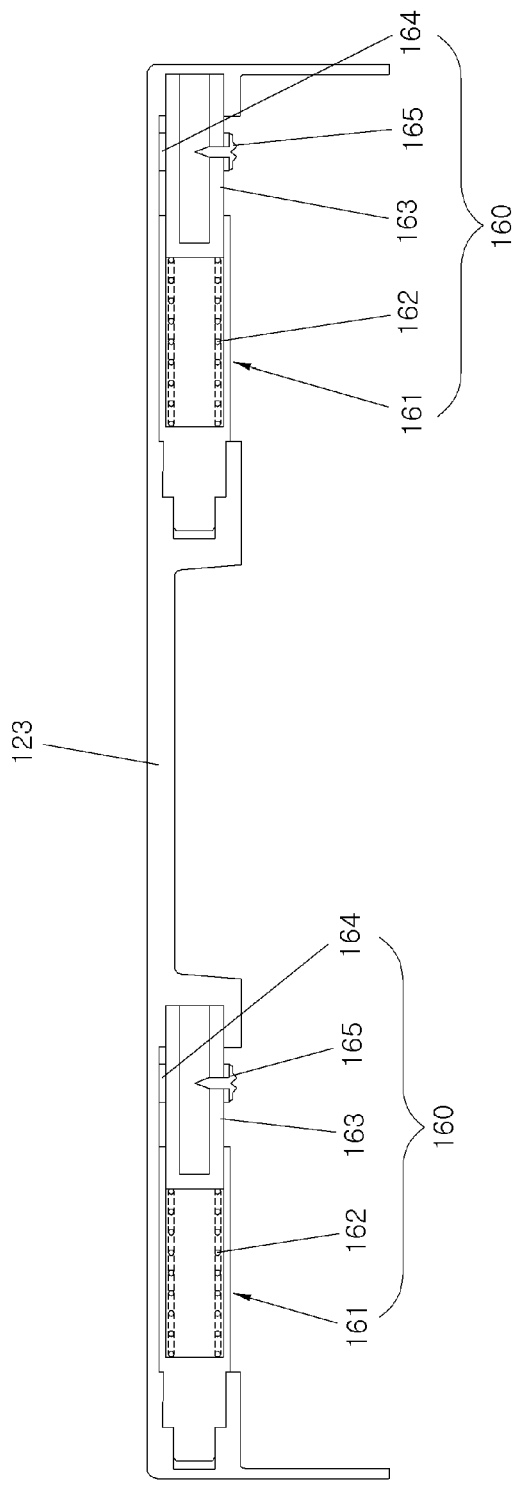
FIG. 6 is a view illustrating a joint hinge device of the side table assembly according to the present disclosure.
Figure 7A:
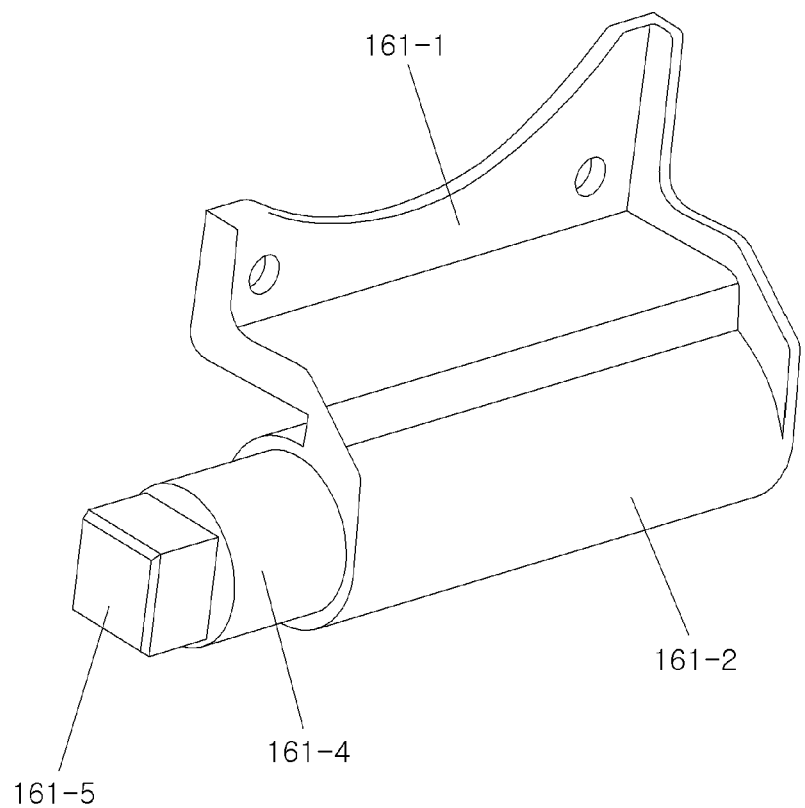
FIGS. 7A and 7B are perspective views of a joint hinge of the joint hinge device.
Figure 7B:
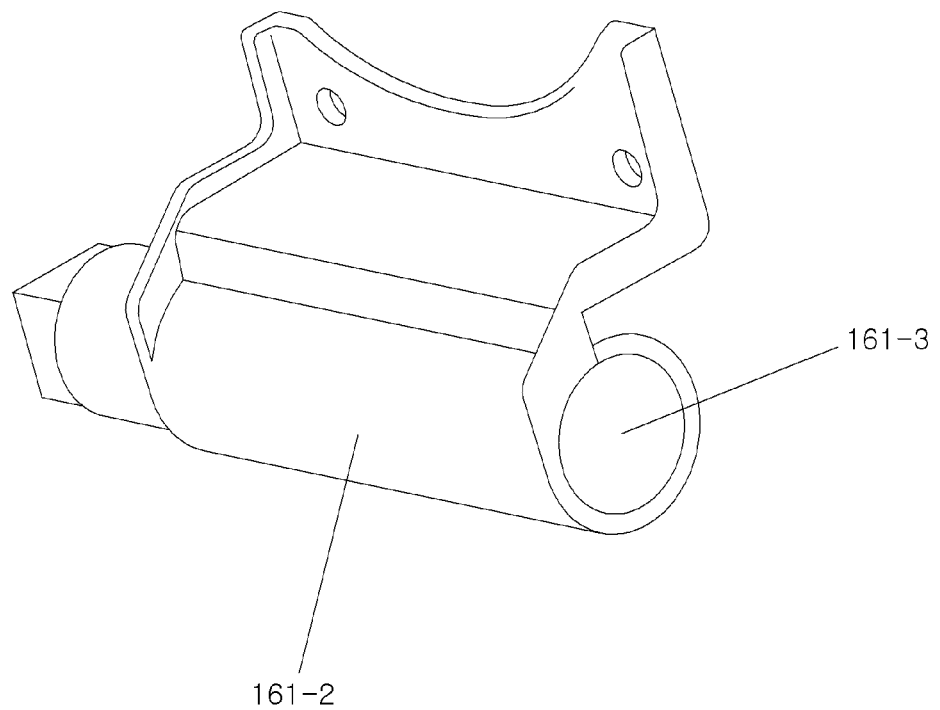
Figure 8:
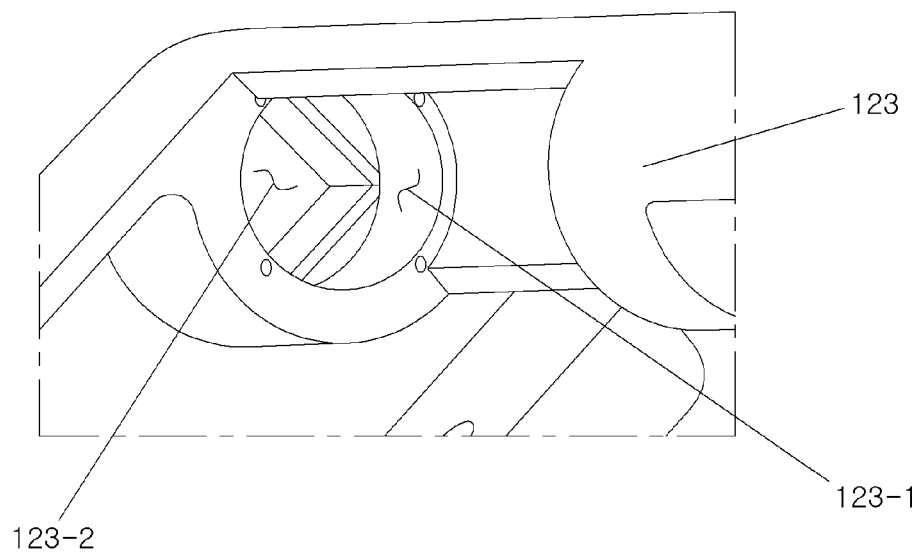
FIG. 8 is an enlarged view of a portion of the joint hinge device shown in FIG. 6.

FIG. 6 is a view illustrating the joint hinge device of the side table assembly according to the present disclosure, FIGS. 7A and 7B are perspective views of a joint hinge of the joint hinge device, and FIG. 8 is an enlarged view of a portion of the joint hinge device shown in FIG. 6.

The joint hinge device 160 is a device that couples the hinge coupling part 123 of the body 120 to the table 110 and enables the table 110 to be rotated with respect to the body 120.

The joint hinge device 160 includes a joint hinge 161 which is coupled to the table 110 on one side and to the hinge coupling part 123 of the body 120 on the other side, a hinge spring 162 for elastically supporting the joint hinge 161 in a longitudinal direction of the body 120, a hinge cylinder 163 coupled between the hinge spring 162 and the hinge coupling part 123, a hinge stopper 164 for restricting a movement of the joint hinge 161 in the longitudinal direction, and a stopper fixing screw 165 for fixing the hinge stopper 164.

The joint hinge 161 includes a coupling part 161-1 having a flat face configured to be coupled to the table 110 and a guide part 161-2 formed at one side of the coupling part 161-1 and configured to be coupled to the hinge coupling part 123 and be rotatable with respect to the hinge coupling part 123.

A body of the guide part 161-2 is preferably formed in a cylindrical shape for rotation. On this guide part, a cylinder inserting hole 161-3 into which the hinge cylinder 163 can be inserted is formed on one side, and a circular protrusion 161-4 having a circular shape in cross section and protruding from the body and a rectangular protrusion 161-5 having a rectangular shape in cross section and protruding from the circular protrusion 161-4 are formed on another side.

The configuration including two joint hinge devices 160 is illustrated in FIG. 6 as one example, and it is preferable to provide two or more joint hinge devices 160 so as to secure rigidity.

It is preferable that, for a rotational operation of the joint hinge device 160, the hinge coupling part 123 of the body 120 also has a circular shape in cross section and is formed to extend in the longitudinal direction. In addition, the body 120 is cut to form the hinge coupling parts which correspond to the number of the joint hinge devices 160.

Therefore, both ends are formed on the cutout provided at one point, and on the basis of the cutout, one side end is coupled to the hinge cylinder 163 and the other side end is coupled to the protrusion of the guide part 161-2.

FIG. 8 shows a circular inserting recess 123-1 and a rectangular inserting recess 123-2 corresponding to the circular protrusion 161-4 and the rectangular protrusion 161-5 of the joint hinge 161.

Since the joint hinge 161 and the hinge coupling part 123 are configured in this manner, when the table 110 is pushed in the longitudinal direction (a rearward direction, the x-direction in FIG. 1) to fold the table 110, the rectangular protrusion 161-5 is escaped from the rectangular inserting recess 123-2, and thus the table can be rotated in a downward direction (i.e., the z-direction in FIG. 1).

When the table 110 is retreated (reversed) in the x direction, the hinge spring 162 is compressed. Here, a retreat distance of the table is determined by the hinge stopper 164 preventing a movement of the joint hinge 161 when retreated.

The hinge stopper 164 is coupled to an upper face of the hinge cylinder 163 by the stopper fixing screw 165.

Figure 9:
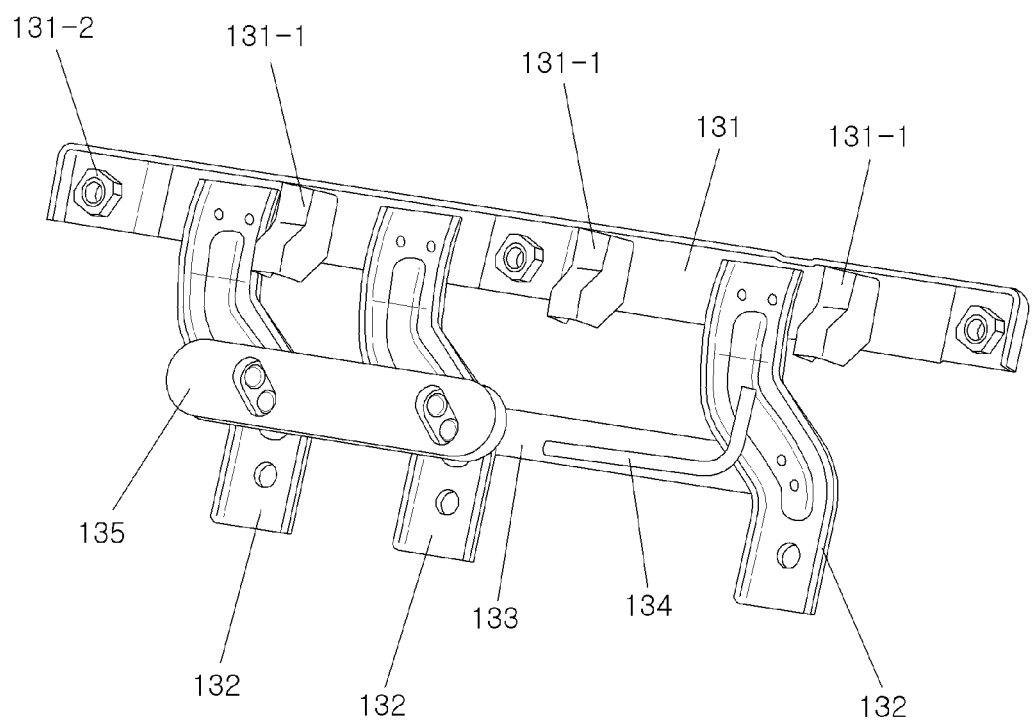
FIG. 9 is a view illustrating a frame of the side table assembly according to the present disclosure.
Figure 10:
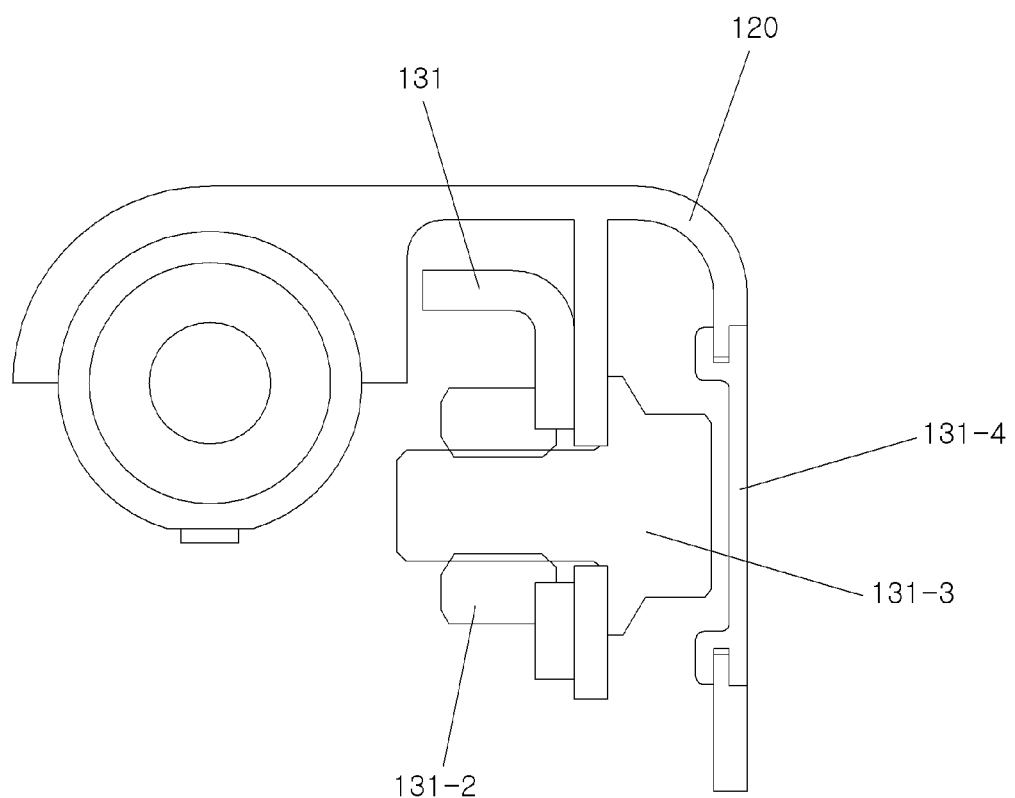
FIG. 10 is a view illustrating a coupling portion of the frame to which the body is coupled.

FIG. 9 is a view illustrating the frame of the side table assembly according to the present disclosure, and FIG. 10 is a view illustrating a coupling portion of the frame to which the body is coupled.

The frame 130 is configured to stably support the body 120, and includes an upper bracket 131, a middle bracket 132, a lower bracket 133, the wire 134, a stopper plate 135 and the like.

The upper bracket 131 is provided in a longitudinal direction corresponding to the longitudinal direction of the body 120 and is coupled to an inner side face of the body 120. Here, a weld nut 131-2 is provided on the upper bracket for coupling the upper bracket to the body 120.

As shown in FIG. 10, the upper bracket 131 and the body 120 are coupled to each other by coupling the weld nut 131-2 and a bolt 131-3 passing through the upper bracket 131 and the body 120, and a plug 131-4 is coupled to the body 120 to prevent the bolt from being exposed to the outside.

In addition, the upper bracket 131 is provided with a reinforcing rib supporter 131-1 at a position corresponding to the reinforcing rib 112-2 of the rear panel 112 of the table 110.

That is, the reinforcing rib 112-2 and the reinforcing rib supporter 131-1 are configured to be in contact with each other in a state in which the table 110 is unfolded. It is preferable that the reinforcing rib supporter 131-1 is in contact with one longitudinal end of each reinforcing rib 112-2.

One side of the middle bracket 132 is coupled to the upper bracket 131 to maintain rigidity of the frame 130, and the middle bracket extends in a downward direction to allow other side thereof to be coupled to the mounting bracket 140.

In other words, the mounting bracket 140 is brought into contact with and coupled to a lower portion of the middle bracket 132 by a bolt, a screw, and the like, and the other side of the bent-shaped mounting bracket 140 is coupled to the seat by welding or the like.

It is preferable that a plurality of middle brackets are provided as shown in FIG. 9. In order to be coupled to the stopper plate 135, in addition, two middle brackets 132 may be disposed closer to each other than the other middle brackets and these two middle brackets 132 may be coupled to the stopper plate 135.

The lower bracket 133 is configured to be connected between and to two middle brackets 132 of the plurality of the middle brackets to reinforce rigidity.

In addition, the wire 134 extending from the middle bracket 132 is coupled to the lower bracket 133, so that the wire guide 112-3 may be fastened to the wire 134 when the table 110 is folded.

Hereinafter, an operation of the side table assembly for a vehicle seat having the above described configuration is described.

FIGS. 11A to 12B are views partially illustrating an operation state of the side table assembly according to the present disclosure, and FIG. 13 is a view illustrating an overall operation state of the side table assembly.

Figure 11A:
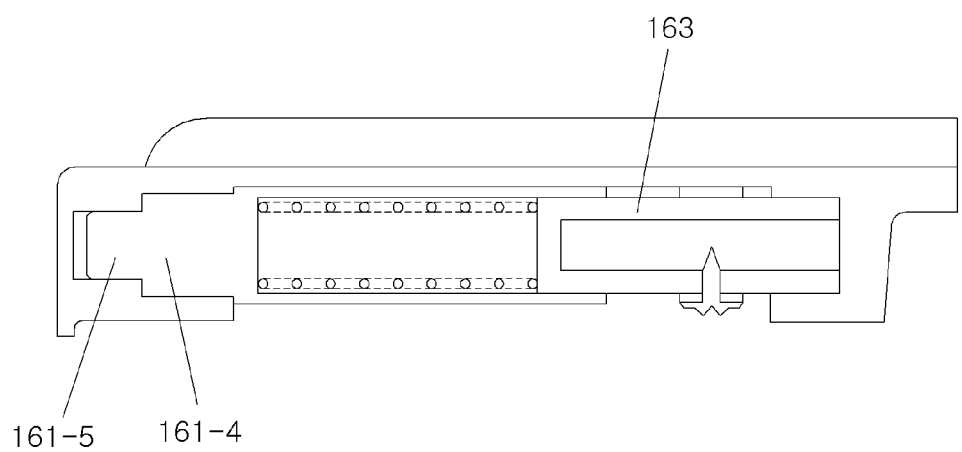
FIGS. 11A, 11B, 12A, and 12B are views partially illustrating an operation state of the side table assembly according to the present disclosure.
Figure 11B:
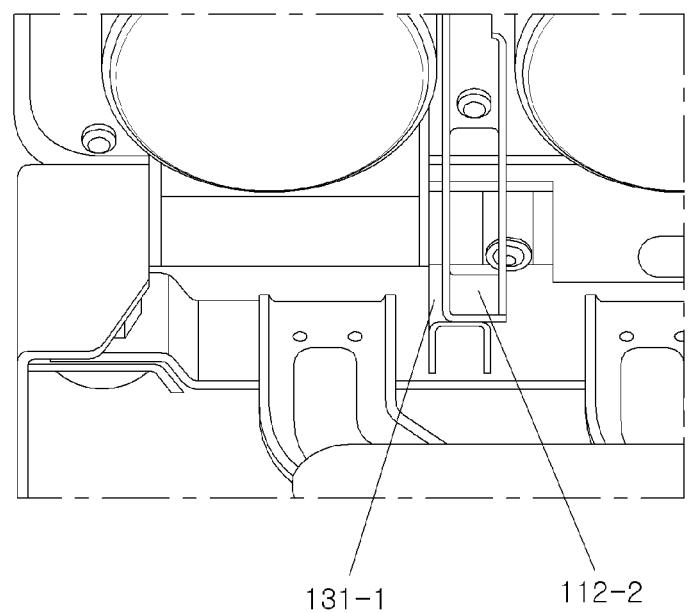

In a state in which the table 110 is unfolded and used as shown in FIGS. 11A and 11B, the circular protrusion 161-4 and the rectangular protrusion 161-5 of the joint hinge 161 of the joint hinge device 160 are inserted into the circular inserting recess 123-1 and the rectangular inserting groove 123-2 of the hinge coupling part 123 of the body 120, respectively, so that the joint hinge device is in a fixed state.

In addition, at this time, the reinforcing rib 112-2 configured on the rear panel 112 is in contact with the reinforcing rib supporter 131-1 of the frame 130 to maintain robustness of the state in which the table 110 is unfolded.

In this state, when a user pushes the table 110 in a longitudinal direction (a rearward direction of the vehicle, x-direction) so as to fold the table 110, the joint hinge 161 is retreated while pushing the hinge spring 162 in a state in which the body 120 is fixed.

Figure 12A:
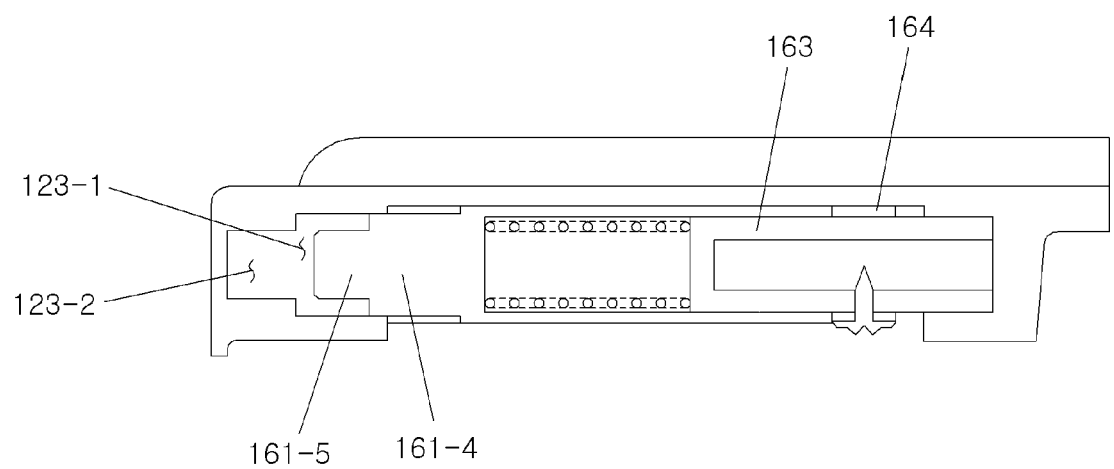
Figure 12B:
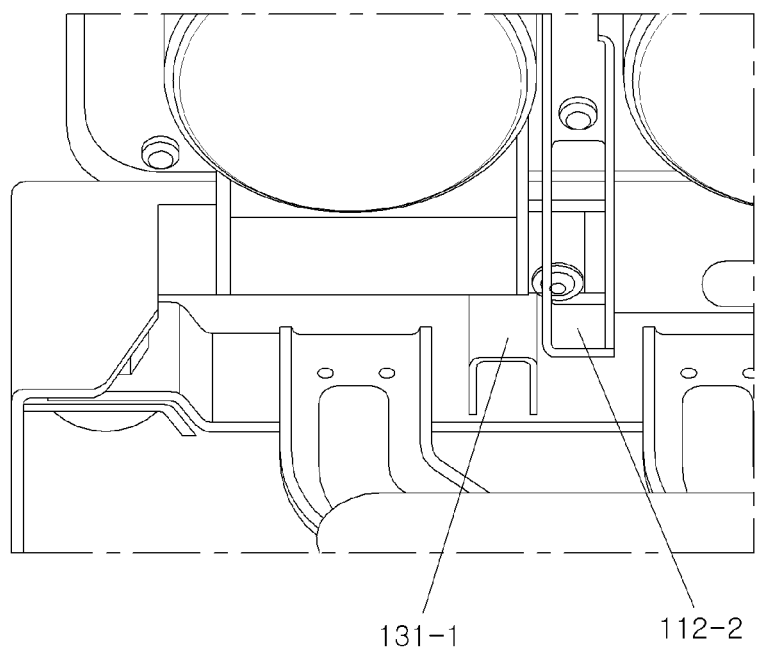

Then, the rectangular protrusion 161-5 is escaped from the rectangular inserting recess 123-2, and a contact between the reinforcing rib 112-2 and the reinforcing rib supporter 131-1 is also released as shown in FIG. 12B, so that the joint hinge 161 becomes rotatable and it is possible to rotate the table 110 in a downward direction.

When the table 110 is rotated in a downward direction as shown in FIG. 13, the wire guide 112-3 formed on the rear panel 112 is fastened to the wire 134 formed on the frame 130, and thus the table 110 may be maintained in a folded state.

Figure 14:
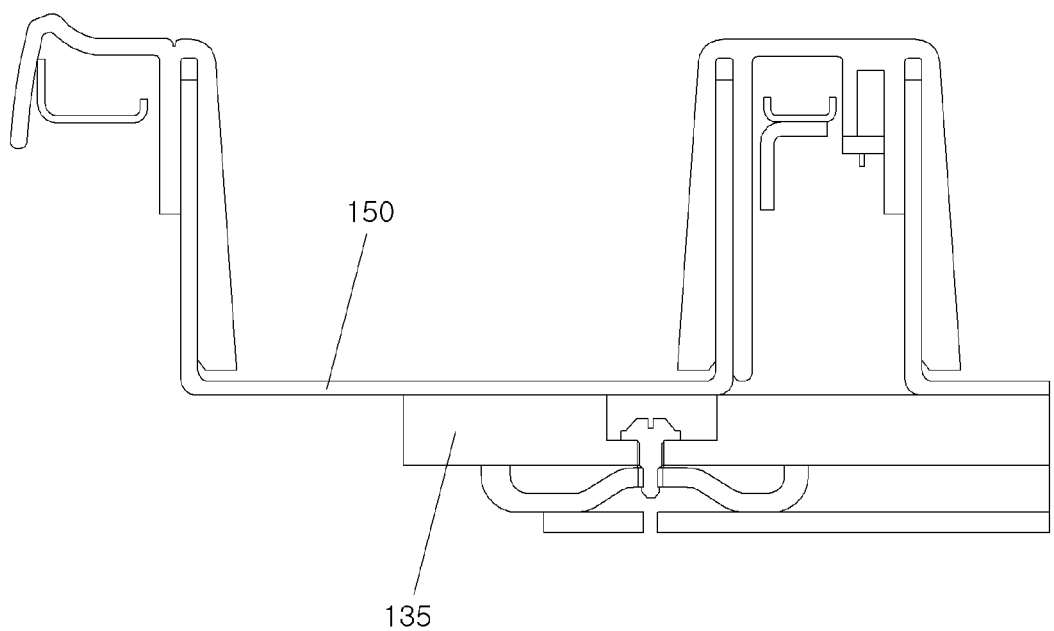
FIG. 14 is a view illustrating a state of the cup holder when the table is folded.

In addition, if the cup holder 150 is moved downward when the table 110 is folded, the cup holder is pushed again and restored by the stopper plate 135 formed on the frame 130 as shown in FIG. 14.

Figure 15A:
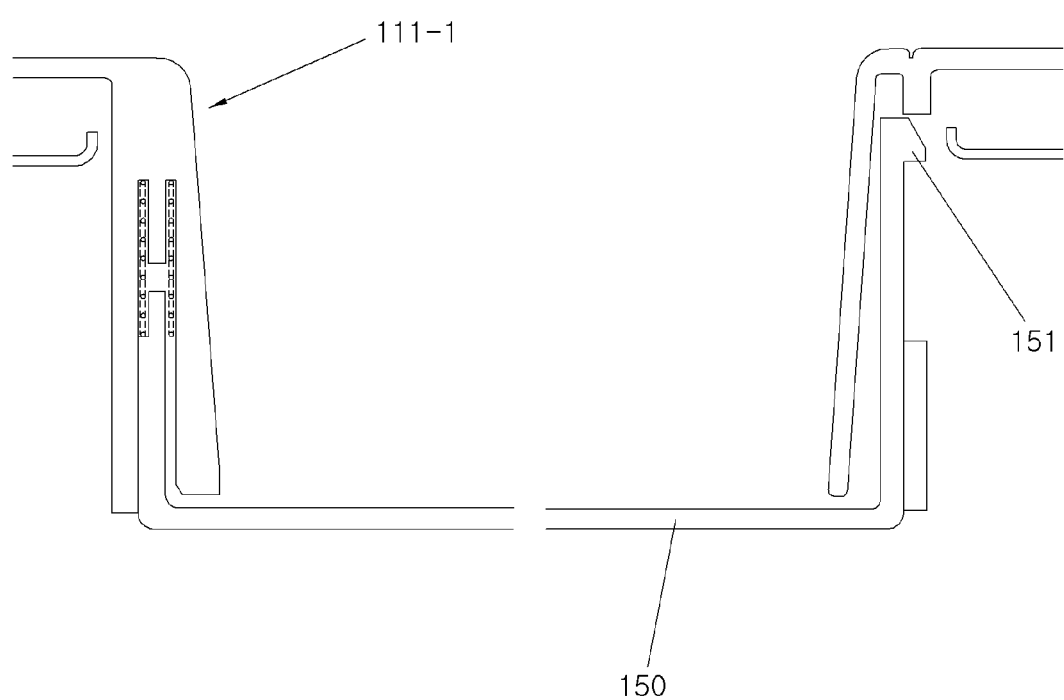
FIGS. 15A and 15B are views illustrating an operation state of the cup holder of the side table assembly according to the present disclosure.
Figure 15B:
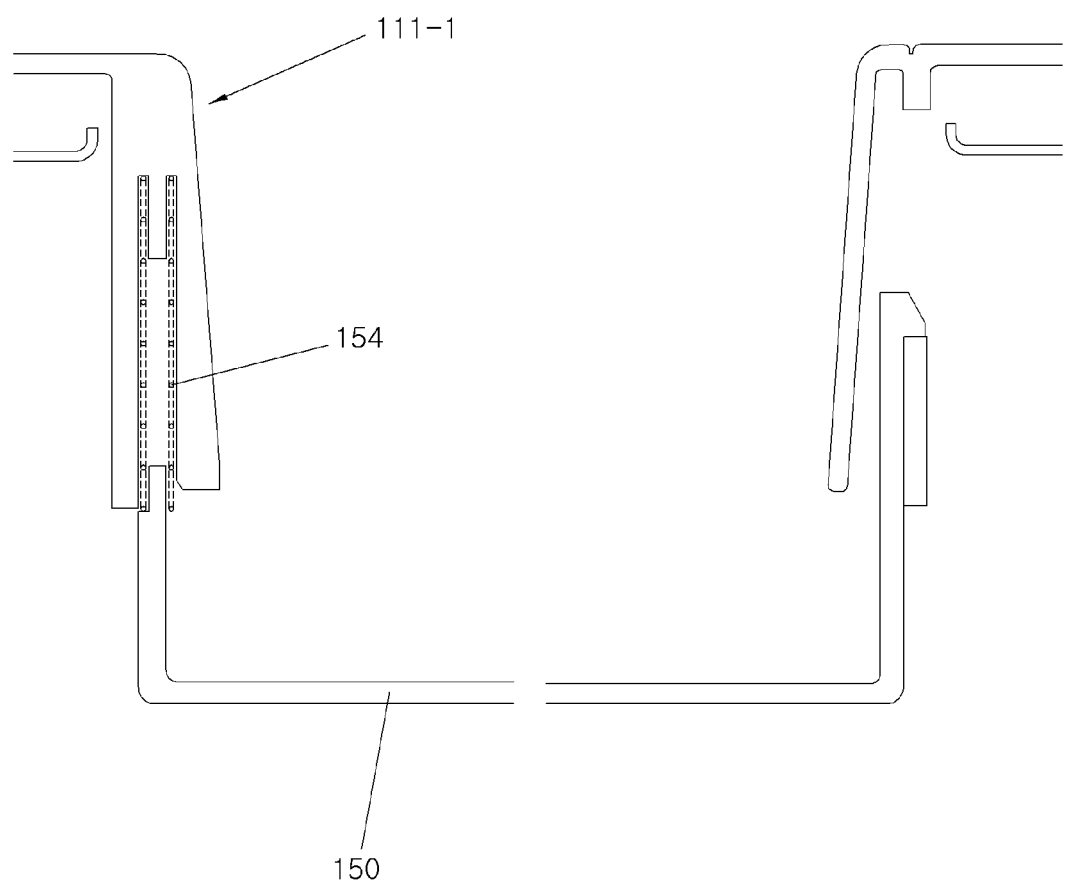

That is, as previously mentioned, when a large and heavy cup is seated on the cup holder, the cup holder 150 of the present disclosure is further moved downward than the cup holder inserting part 111-1 to hold the cup. In other words, in a state as shown in FIG. 15A, when the cup holder 150 is pushed by the cup, the return spring 154 is extended and the cup holder 150 is moved downward as shown in FIG. 15B, and when the cup holder is moved downward, the hook 151 is engaged with the hook guide slit 114-1 to limit a downward movement distance.

FIGS. 16 to 23B illustrate a configuration of the side table assembly according to another embodiment of the present disclosure. Hereinafter, a side table assembly according to another embodiment of the present disclosure will be described, but the description on the same configurations as those of the previous embodiment will be reduced or omitted.

The previous embodiment has a configuration in which the cup holder is supported by the return spring and is moved downward by the cup, while the side table assembly according to another embodiment shown in FIGS. 16 to 23B has a configuration in which a button is employed to move the cup holder downward.

Therefore, the cup holder, the protrusion and the return spring of the cup holder inserting part disclosed in the foregoing embodiment are not included in this embodiment.

Figure 16:
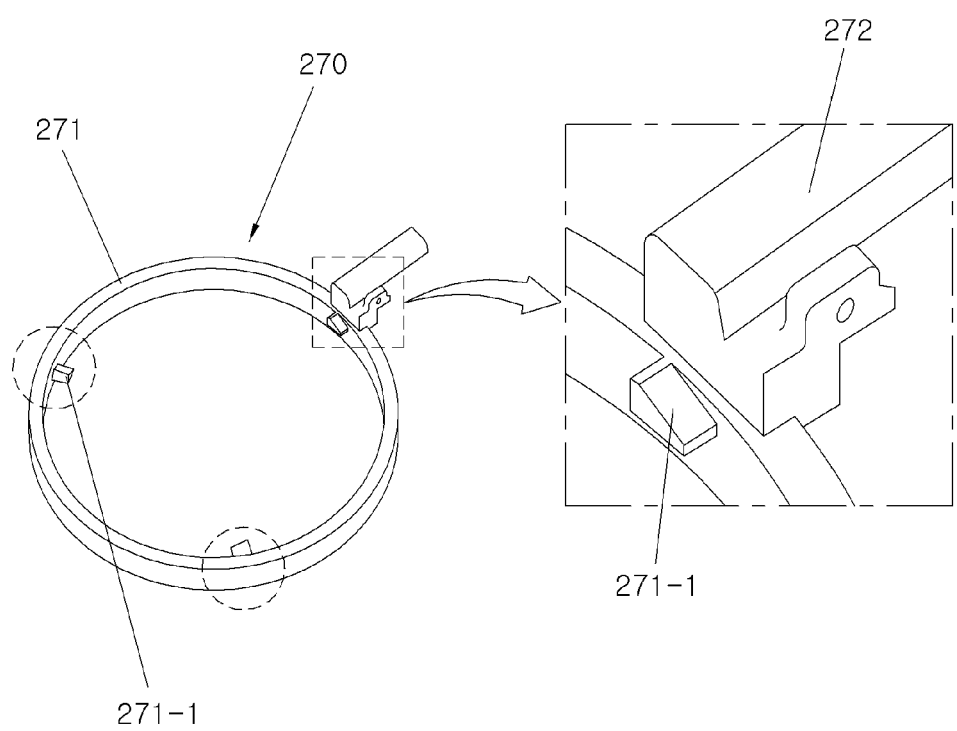
FIG. 16 is a view illustrating a cup rotator of a side table assembly according to another embodiment of the present disclosure.

To replace the above elements, a cup rotator 270 configured as shown in FIG. 16 is provided.

The cup rotator 270 is an element configured to fix a cup holder 250 to a cup holder inserting part 211 or to operate the cup holder.

The cup rotator 270 has a circular support part 271 having a diameter larger than that of a side face of the cup holder inserting part 211, and a plurality of inner protrusions 271-1 are formed on an inside of the circular support part 271 for coupling the cup rotator to the cup holder inserting part 211.

Preferably, the inner protrusion 271-1 has a shape such that it is inclined in a tangential direction of the circular support part 271 as shown in FIG. 16.

In addition, an operation part 272 is formed on one side of the circular support part 271, and the operation part 272 is extended and protruded outward and has an upper face rounded in one direction.

Figure 17:
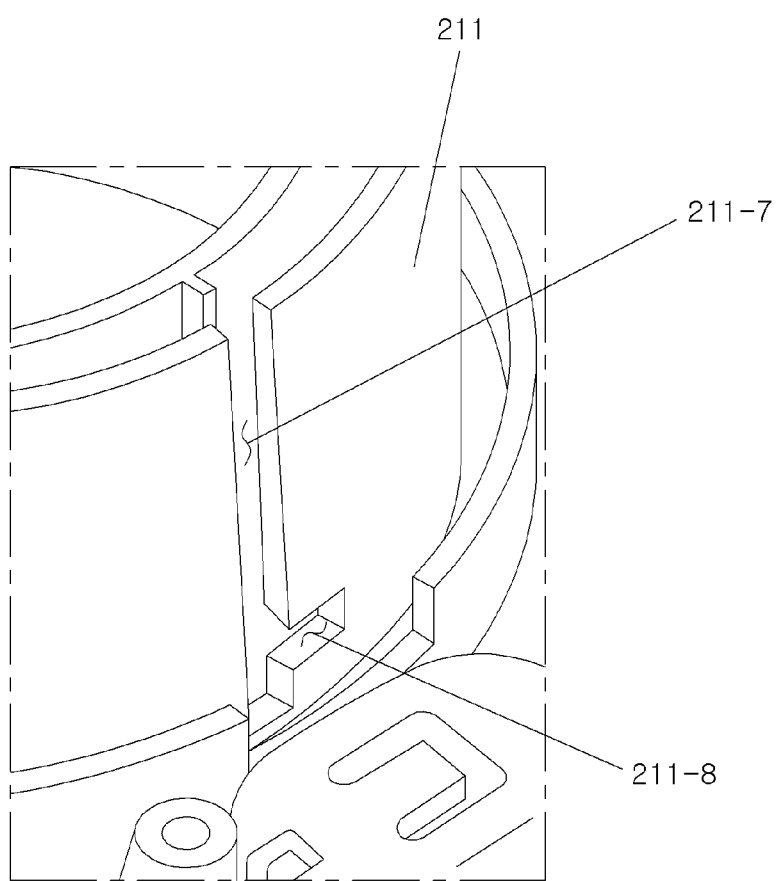
FIG. 17 is a view illustrating a cup holder inserting part of the side table assembly according to another embodiment of the present disclosure.
Figure 18:
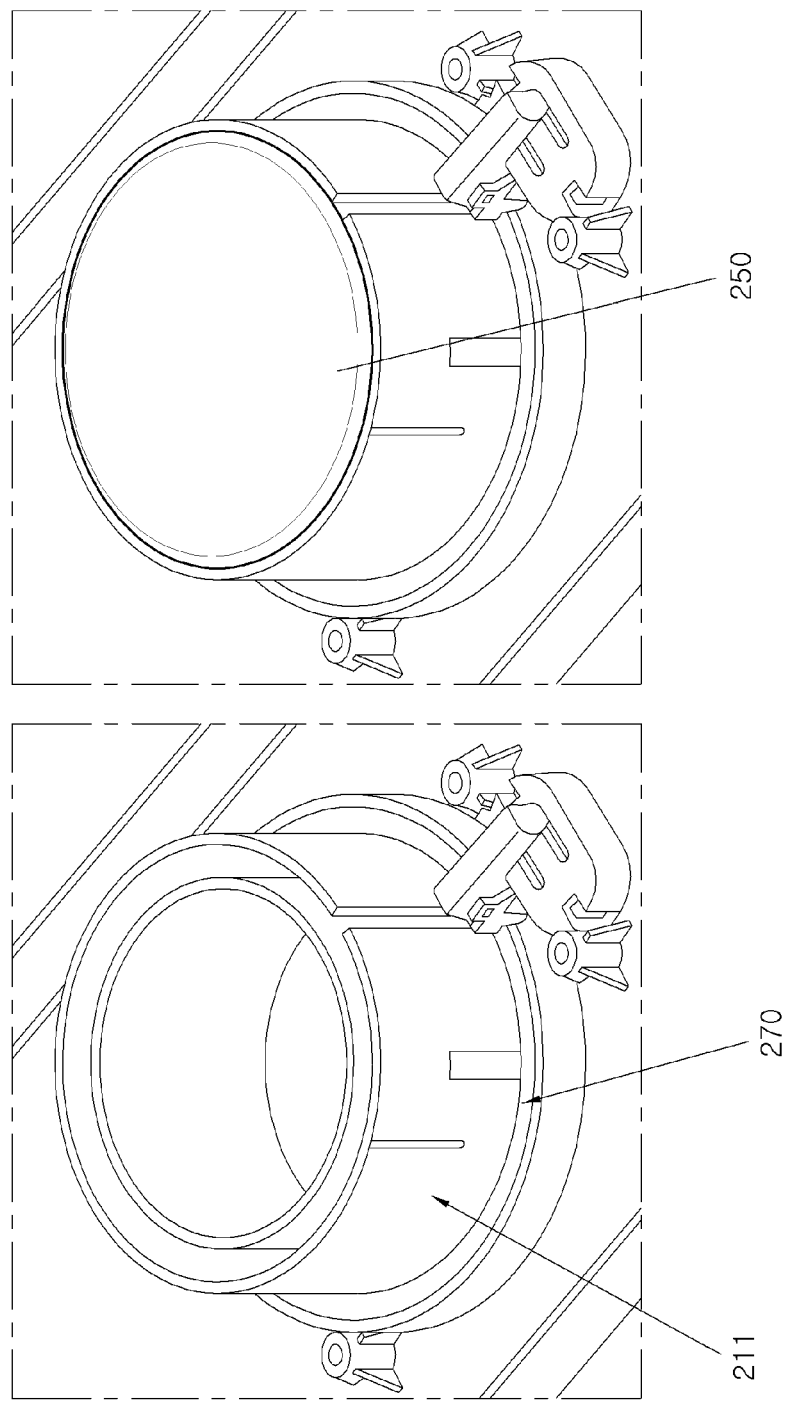
FIG. 18 is a view illustrating a mounting state of a cup holder according to another embodiment of the present disclosure.

On the outer wall of the double walls of the cup holder inserting part 211, on the other hand, a rotator guide 211-7 is formed in a longitudinal direction of a side face as shown in FIGS. 17 and 18. This configuration enables the inner protrusion 271-1 of the cup rotator 270 to be inserted upward along the rotator guide 211-7 from a lower side of the cup holder inserting part 211.

On an upper side of the rotator guide 211-7, in addition, a rotator fixing slit 211-8 is formed in a circumferential direction of the outer wall. In this configuration, the inner protrusion 271-1 inserted into the rotator guide 211-7 may be inserted into the rotator fixing slit 211-8, so that the cup rotator 270 may be fastened to the cup holder inserting part 2110.

Further, since the cup rotator 270 should be capable of supporting the cup holder 250 inserted into the space between the double walls of the cup holder inserting part

Figure 19:
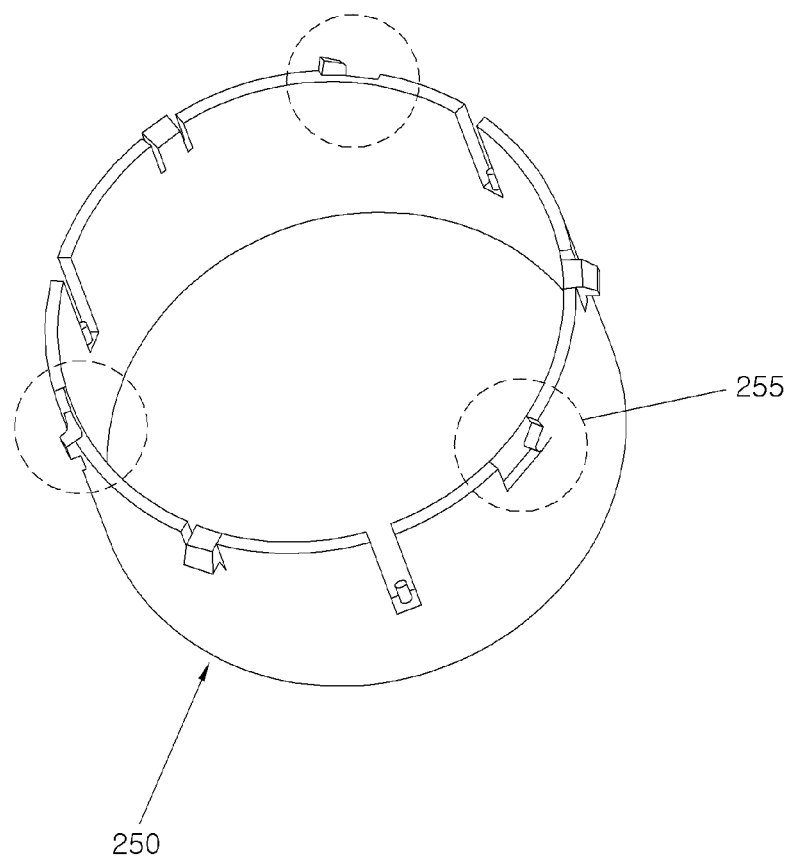
FIG. 19 is a view illustrating the cup holder according to another embodiment of the present disclosure.

211, a rotator restricting groove 255 is formed on an outer side of the cup holder 250 as shown in FIG. 19, and the cup rotator 270 inserted in the rotator restricting groove 255 is restricted by an inner protrusion 255-1 formed to be biased on one side in the rotator restricting groove 255.

Figure 20A:
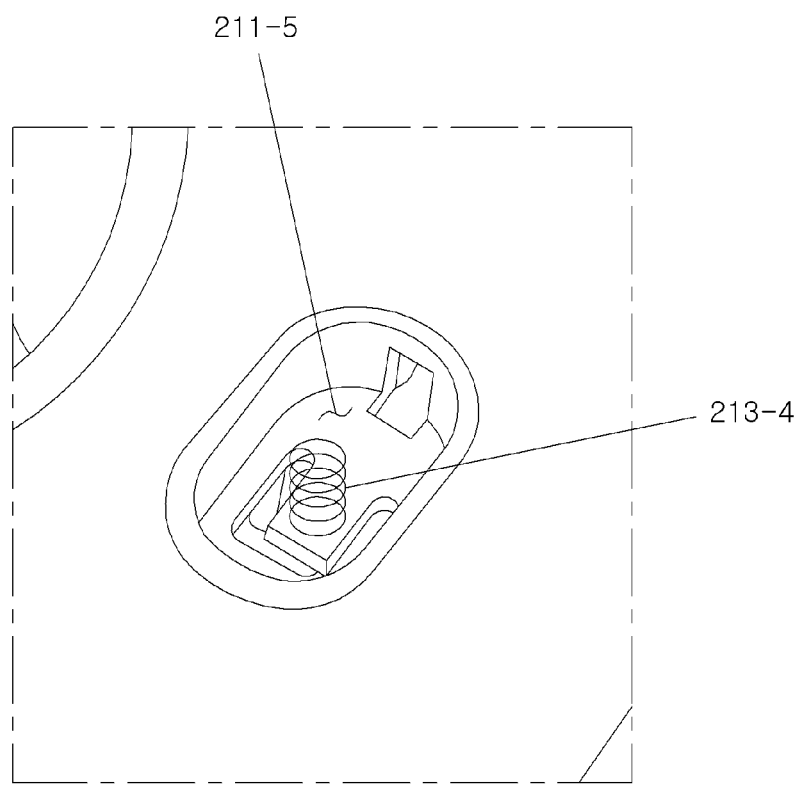
FIGS. 20A and 20B are views illustrating a table and a button according to another embodiment of the present disclosure.
Figure 20B:
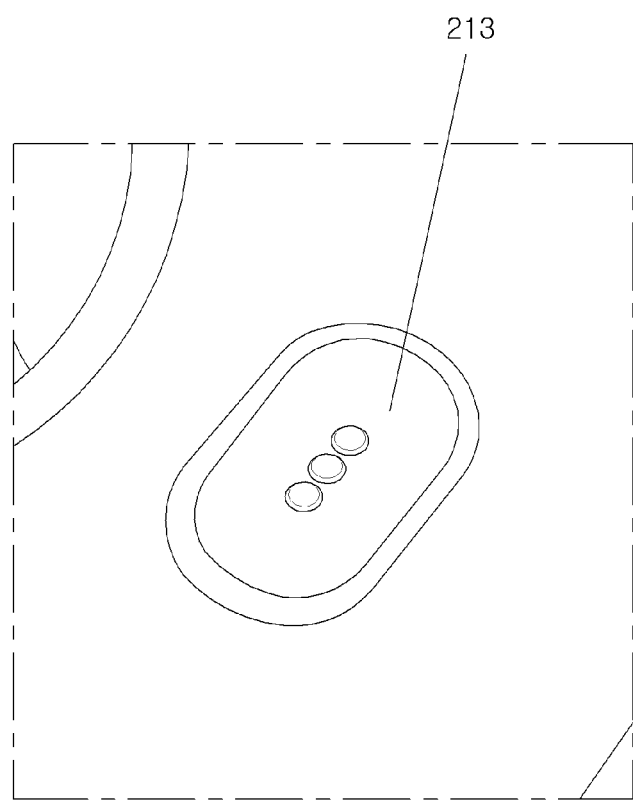
Figure 21:
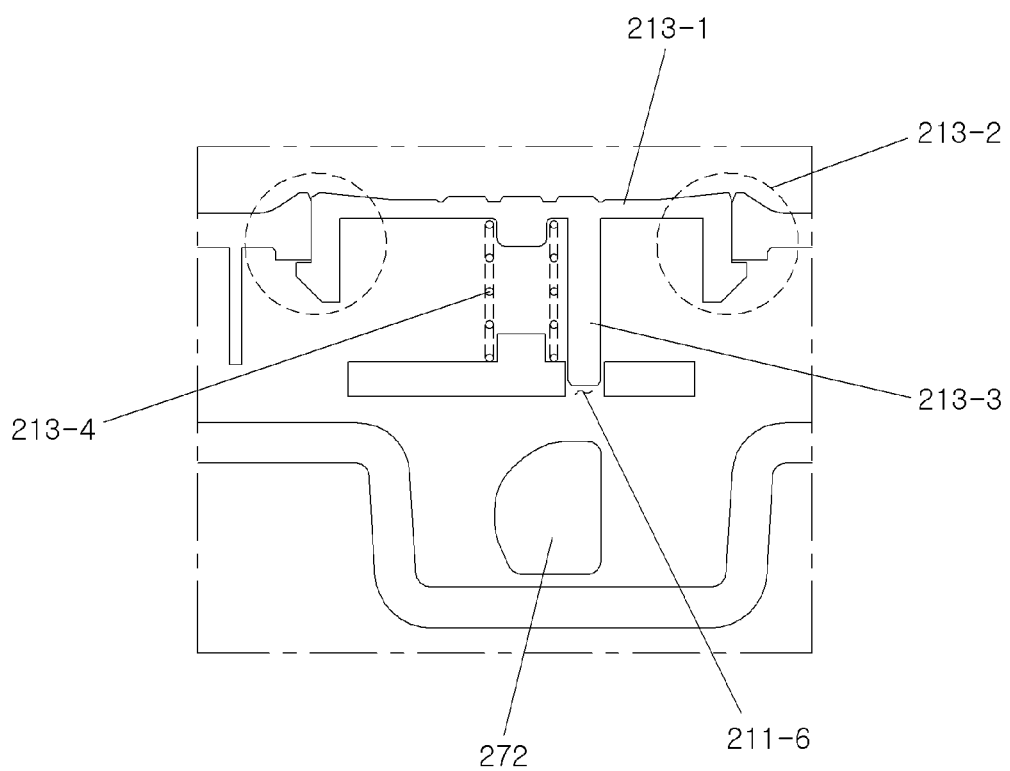
FIG. 21 is a sectional view of the table and the button.

FIGS. 20A and 20B are views illustrating a table and a button, and FIG. 21 is a sectional view of the table and the button.

A button recess 211-5 is formed on an upper face of a table 210 for providing a button, and a button hole 211-6 is also formed in the button recess 211-5.

A button 213 includes a generally flat push part 213-1 and an operation part 213-3 extending from the push part 213-1 in a downward direction.

In addition, in order to prevent a deviation of the button 213, a hook 213-2 is formed to extend from a side face of the button 213 in a downward direction and is coupled to the upper face of the table 210.

Figure 22A:
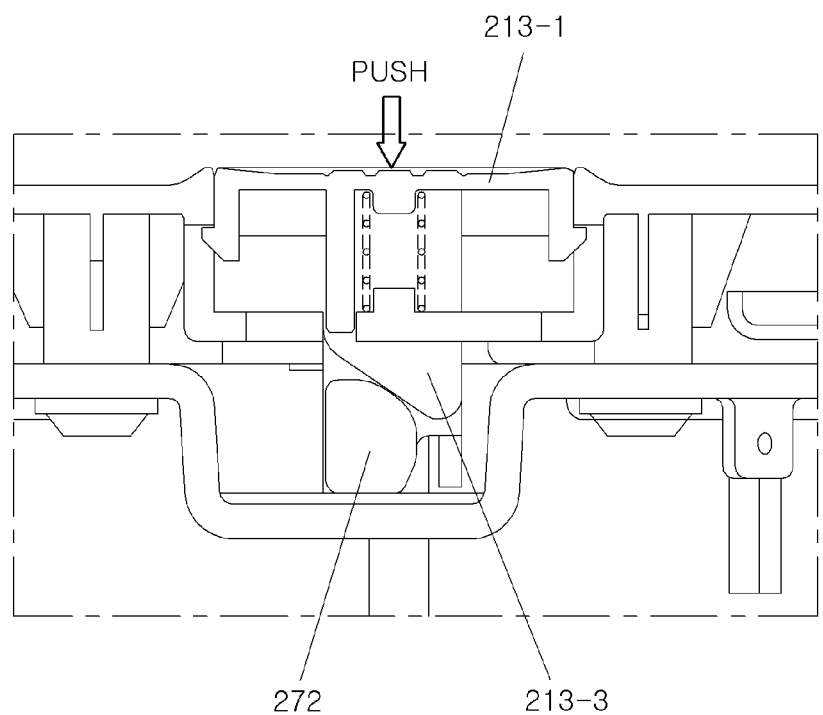
FIGS. 22A, 22B, 23A, and 23B are views illustrating an operation state caused by the button according to another embodiment of the present disclosure.
Figure 22B:
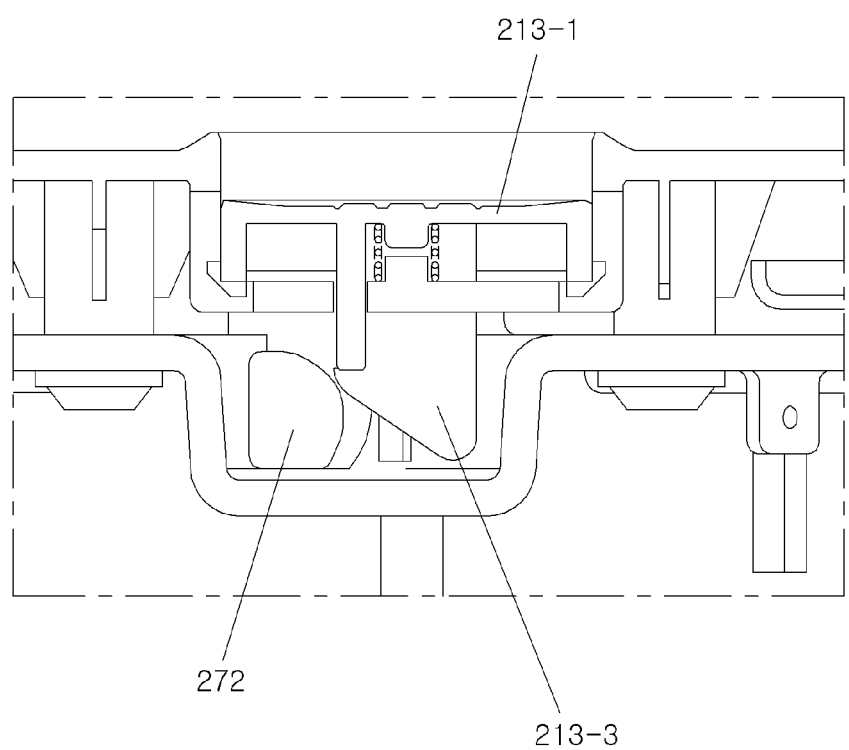

It is preferable that an end of the operation part 272 is formed to be inclined as shown in FIGS. 22A and 22B.

In a state in which the button 213 is not pushed, the operation part 213-3 is in contact with the operation part 272 of the cup rotator 270 as shown in FIG. 22A, and when the button 213 is pushed, the operation part 272 of the cup rotator 270 is pushed laterally by the button 213 as shown in FIG. 22B.

Figure 23A:
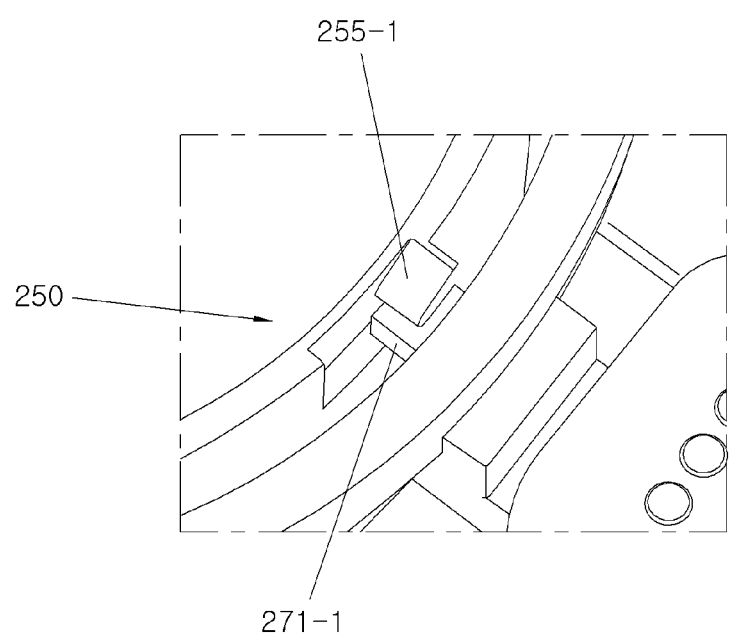
Figure 23B:
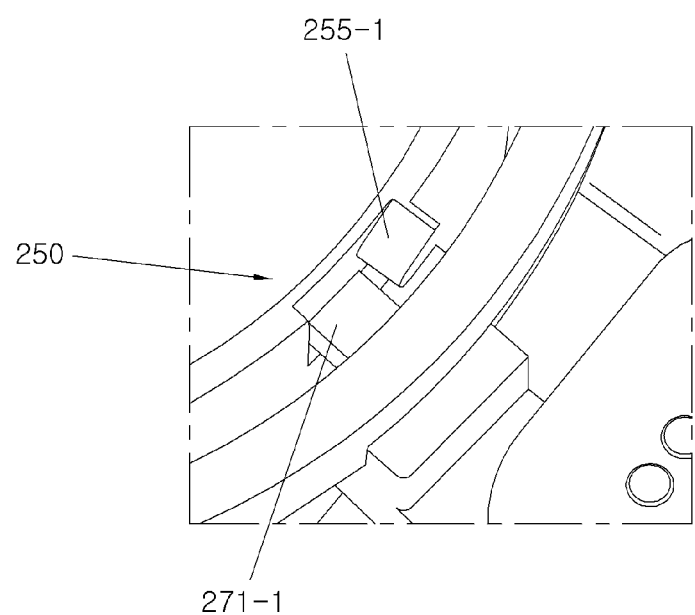

In view of a relation between the cup rotator 270 and the cup holder 250, the inner protrusion 271-1 of the cup rotator 270, which is restricted by the inner protrusion 255-1 formed in the rotator restricting groove 255 of the cup holder 250 as shown in FIG. 23A, is released from a restriction caused by the inner protrusion 255-1 of the rotator restricting groove 255 as shown in FIG. 23B. Therefore, the cup rotator 270 does not hold the cup holder 250 so as to allow the cup holder 250 to be moved downward.

A downward position of the cup holder is limited by the hook formed on the cup holder as in the previous embodiment, and the present embodiment provides a convenience in that a user may change a vertical position of the cup holder using the button according to the need.

Figure 24A:
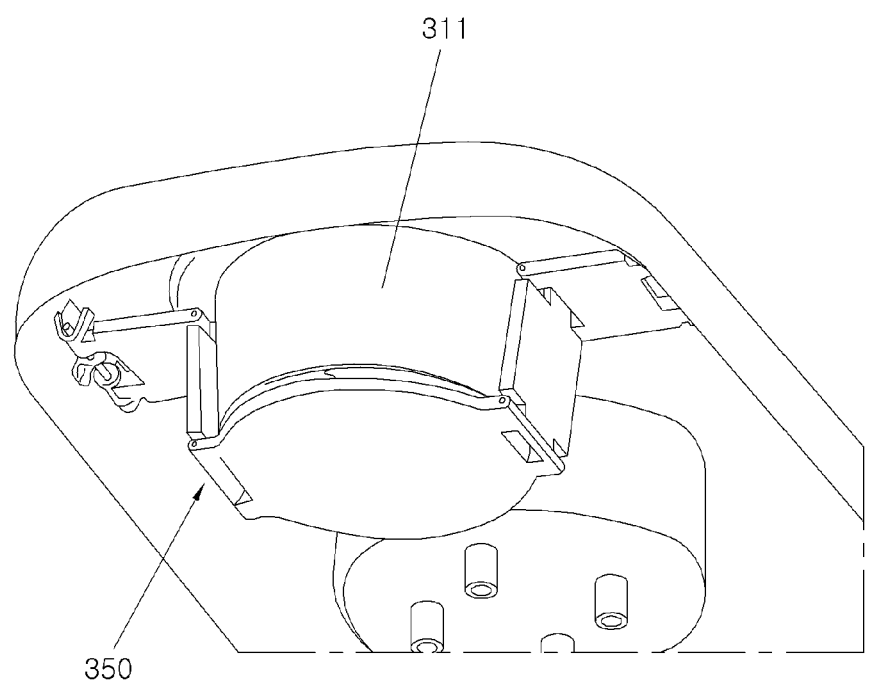
FIGS. 24A and 24B are views illustrating a side table assembly according to still another embodiment of the present disclosure.
Figure 24B:
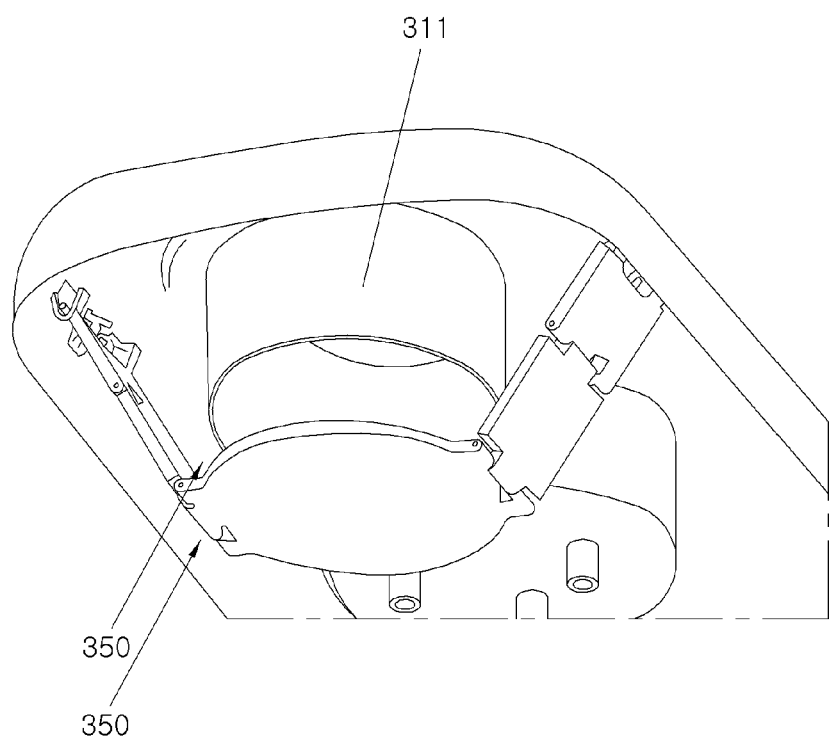
Figure 25:
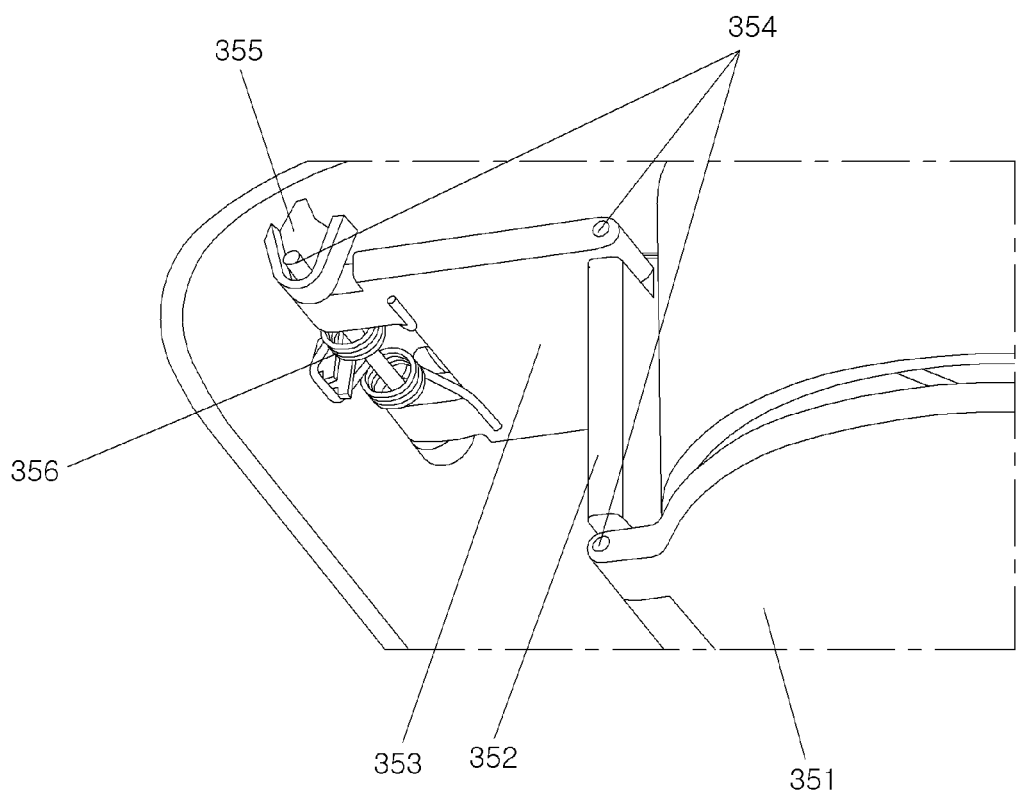
FIG. 25 is a view partially illustrating the side table assembly according to still another embodiment of the present disclosure.

FIGS. 24A-24B and 25 illustrate a side table assembly according to still another embodiment of the present disclosure.

A side table assembly according to still another embodiment of the present disclosure is described with reference to the above drawings, and the description of the same structure as the previous embodiment will be omitted.

This embodiment is an embodiment having a configuration of a cup holder which differs from that of the cup holders of two previous embodiments.

Therefore, unlike the cup holder inserting part disclosed in the previous embodiments, a cylindrical cup holder inserting part 311 through which the cup may pass is formed, which is not directly coupled to the cup holder.

In addition, the cup holder has a configuration in which a bottom plate 351, a first link 352 and a second link 353 are linked by rotation hinges 354 provided therebetween, respectively. Therefore, when the cup is placed on the bottom plate in a state as shown in FIG. 24A, the bottom plate 351 is moved downward as shown in FIG. 24B, and the first link 352 and the second link 353 are also rotated with respect to the rotation hinges 354 in response to downward movement of the bottom plate.

The rotation hinge 354 coupled to an end of the second link 353 is coupled to a table fixing part 355 having both sides coupled to a rear face of the table, and one end of a tension spring 356 is coupled to the rear face of the table and the other end is coupled to the second link 353, and thus the tension spring supports the second link 353 to elastically support the cup holder 350 and generates a restoring force after being elastically deformed as shown in FIG. 24B.

The side table assembly for a vehicle seat of the present disclosure can easily fold and unfold the table without a lever.

In other words, the table is automatically fixed by the spring when a user unfolds the table, and when the user folds the table, the table is moved downward by slightly pushing it back, so that it is convenient to operate the side table assembly.

In addition, there is no risk of injury to a user's body or damage to article caused by a link because the side table assembly of the present disclosure may also be constructed without a link.

Also, an external appearance of the side table assembly is not exposed to the outside, there is no problem such as occurrence of rust on the components.

Further, by adopting the above-described configuration that enhances structural safety, the safety of the side table assembly can be ensured with sufficient strength without affecting the volume and operating force of the structure.

In addition, since the cup holder is automatically moved downward by a weight of the cup, even when a large cup is used, it is easy to use. In particular, when a weight is removed, the cup holder is returned to its original position, so that it is convenient to use.

Further, the side table assembly of the present disclosure can also be implemented by the button, so that it is possible to conveniently select and employ a type of the side table assembly depending on a size of the cup.

Although the above-described present disclosure has been described with reference to the illustrated drawings, it will be apparent to those skilled in the art that various changes and modifications can be made without departing from the scope of the present disclosure. Accordingly, such modifications or changes should be considered as being fallen with the claims of the present disclosure, and the scope of the present disclosure should be construed on the basis of the appended claims.

What is claimed is:

1. A side table assembly for a vehicle seat, comprising:
    a table on which a cup holder inserting part is formed;
    a body configured to be arranged on a side face of the vehicle seat; and
    a joint hinge device coupled between the body and the table to allow the table to be rotated with respect to the body,
    wherein the joint hinge device comprises:
        a joint hinge configured to be connected to the table at one side and connected to the body at another side;
        a hinge spring inserted into the joint hinge to elastically support the joint hinge in a longitudinal direction of the body; and
        a hinge cylinder configured to have one side inserted into the joint hinge and being in contact with the hinge spring and another side inserted into and supported by the body,
    wherein:
        the joint hinge comprises a coupling part having a flat face and a guide part formed at one side of the coupling part and having a circular shape in a cross section, and
        the guide part is configured such that a cylinder inserting hole into which the hinge spring and the hinge cylinder are inserted is formed on one side of the guide part, and a circular protrusion having a circular shape in cross section and protruding therefrom and a rectangular protrusion having a rectangular shape in cross section and protruding from the circular protrusion are formed on another side of the guide part, and wherein the body is configured such that a circular inserting recess and a rectangular inserting recess corresponding to the circular protrusion and the rectangular protrusion, respectively, are sequentially formed thereon.

2. The side table assembly of claim 1, wherein the hinge cylinder is configured to allow a hinge stopper to be coupled thereto to restrict a movement of the joint hinge towards the hinge cylinder.

3. A side table assembly for a vehicle seat, comprising:
a table on which a cup holder inserting part is formed;
a body configured to be arranged on a side face of the vehicle seat; and
a joint hinge device coupled between the body and the table to allow the table to be rotated with respect to the body,
wherein the joint hinge device comprises:
  a joint hinge configured to be connected to the table at one side and connected to the body at another side;
  a hinge spring inserted into the joint hinge to elastically support the joint hinge in a longitudinal direction of the body; and
  a hinge cylinder configured to have one side inserted into the joint hinge and being in contact with the hinge spring and another side inserted into and supported by the body,
wherein the cup holder inserting part has an opened upper face and a closed lower face and is formed in a double cylindrical shape extending downward from the table, and further comprising a cup holder inserted between the double cylinders of the cup holder inserting part, wherein:
the cup holder has a plurality of cutouts formed thereon and a plurality of protrusions formed in the plurality of cutouts, respectively, in an upward direction,
the cut holder inserting part has a plurality of protrusions corresponding to the protrusions of the cup holder and formed between the double cylinders in a downward direction, and
the cup holder further comprises a return spring, and
wherein the protrusion of the cup holder is inserted into a first side of the return spring and the protrusion of the cup holder inserting part is inserted into a second side of the return spring.

4. The side table assembly of claim 3, wherein:
the cup holder has a plurality of hooks formed on an upper side thereof and protruding outward, and
a plurality of hook guide slits corresponding to the plurality of hooks are formed on an upper side of the cup holder inserting part, whereby when the cup holder is moved downward by an external force, the plurality of hooks are engaged with the plurality of hook guide slits to limit a downward movement distance.

5. The side table assembly of claim 3, further comprising a cup rotator having a circular support part having a diameter larger than that of a side face of the cup holder inserting part and an operation part extended and protruded outward from one side of the circular support part, wherein a plurality of inner protrusions are formed on an inside of the circular support part, and a rotator guide is formed by cutting the cup holder inserting part in a longitudinal direction, whereby the cup rotator is inserted into the cut holder inserting part by inserting the inner protrusion of the cup rotator into the rotator guide.

6. The side table assembly of claim 5, wherein the rotator guide has a rotator fixing slit formed on an upper side thereof and extended in a circumferential direction of the cup holder inserting part.

7. The side table assembly of claim 6, wherein the cup holder has a rotator restricting groove formed on an outer side thereof, and an inner protrusion is formed on and protruded from one side in the rotator restricting groove.

8. The side table assembly of claim 7, wherein the cup holder has a plurality of hooks formed on an upper side thereof and protruded outward, and the cup holder inserting part has a plurality of hook guide slits formed on an upper side thereof and corresponding to the plurality of hooks, respectively, whereby when the cup holder is moved downward by an external force, the plurality of hooks are engaged with the plurality of hook guide slits, respectively to limit a downward movement distance.

9. The side table assembly of claim 7, further comprising a button configured to be inserted into a button recess formed on the table, wherein the button comprises a push part exposed on the table and an operation part formed to extend from the push part in a downward direction, whereby when the button is pushed, the operation part of the button pushes the operation part of the cup rotator restricted in the rotator restricting groove to allow the operation part of the cup rotator to be deviated from the inner protrusion of the rotator restricting groove.

10. A side table assembly for a vehicle seat, comprising:
a table on which a cup holder inserting part is formed;
a body configured to be arranged on a side face of the vehicle seat; and
a joint hinge device coupled between the body and the table to allow the table to be rotated with respect to the body;
a frame configured to be coupled to the body; and
a mounting bracket configured to couple the frame to the vehicle seat,
wherein the joint hinge device comprises:
  a joint hinge configured to be connected to the table at one side and connected to the body at another side;
  a hinge spring inserted into the joint hinge to elastically support the joint hinge in a longitudinal direction of the body; and
  a hinge cylinder configured to have one side inserted into the joint hinge and being in contact with the hinge spring and another side inserted into and supported by the body,
wherein the frame comprises:
  an upper bracket provided in a direction corresponding to a longitudinal direction of the body and being coupled to an inner face of the body;
  a plurality of middle brackets configured to extend downward from the upper bracket; and
  a lower bracket configured to be connected between the middle brackets, and
wherein the table has a reinforcing rib formed on a rear face thereof, and the upper bracket has a reinforcing rib supporter formed thereon and configured to support the reinforcing rib in a state in which the table is unfolded.

11. The side table assembly of claim 10, wherein the frame further comprises a stopper plate coupled to two middle brackets of the plurality of middle brackets at both sides thereof.

12. The side table assembly of claim 11, wherein the stopper plate is coupled at a position corresponding to the cup holder inserting part.

13. The side table assembly of claim 10, wherein a wire guide is coupled to the rear face of the table and a wire configured to be coupled to the wire guide in a state in which the table is folded is coupled to the middle bracket.

\* \* \* \* \*